US011072340B2

(12) United States Patent
Park et al.

(10) Patent No.: US 11,072,340 B2
(45) Date of Patent: Jul. 27, 2021

(54) MOBILE ITS STATION AND METHOD OF OPERATING THE SAME

(71) Applicant: LG ELECTRONICS INC., Seoul (KR)

(72) Inventors: Yongsoo Park, Seoul (KR); Inhwan Kim, Seoul (KR); Dongkyun Ahn, Seoul (KR); Jeongjoo Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 309 days.

(21) Appl. No.: 16/242,174

(22) Filed: Jan. 8, 2019

(65) Prior Publication Data
US 2020/0062270 A1 Feb. 27, 2020

(30) Foreign Application Priority Data
Aug. 22, 2018 (WO) ............... PCT/KR2018/009653

(51) Int. Cl.
*B60W 50/00* (2006.01)
*B60W 10/18* (2012.01)
*B60W 20/50* (2016.01)
*B60W 30/16* (2020.01)
*B60W 30/06* (2006.01)
*B60W 40/04* (2006.01)
*B60W 40/06* (2012.01)
*H04L 1/00* (2006.01)
(Continued)

(52) U.S. Cl.
CPC ........ *B60W 50/0098* (2013.01); *B60W 10/18* (2013.01); *B60W 20/50* (2013.01); *B60W 30/06* (2013.01); *B60W 30/16* (2013.01); *B60W 40/04* (2013.01); *B60W 40/06* (2013.01); *H04L 1/0061* (2013.01); *H04W 4/40* (2018.02); *H04W 74/0808* (2013.01); *B60W 2556/65* (2020.02)

(58) Field of Classification Search
CPC .. B60W 50/0098; B60W 30/16; B60W 30/06; B60W 10/18; B60W 20/50; B60W 40/04; B60W 40/06; B60W 2556/65; H04W 74/0808; H04W 4/80; H04W 4/024; H04W 4/12; H04W 4/38; H04L 1/0061
See application file for complete search history.

(56) References Cited

U.S. PATENT DOCUMENTS 8,818,609 B1* 8/2014 Boyko ................. G01S 17/931
701/28
9,368,936 B1* 6/2016 Lenius .................... G01S 17/10
(Continued)

FOREIGN PATENT DOCUMENTS

JP 2009-44645 A 2/2009
JP 2018-19442 A 2/2018
(Continued)

*Primary Examiner* — Mussa A Shaawat
(74) *Attorney, Agent, or Firm* — Birch, Stewart, Kolasch & Birch, LLP

(57) ABSTRACT

A method of controlling a mobile intelligent transport system (ITS) station. The method includes sensing a power of a signal received on a first channel of a dedicated short-range communication (DSRC) interface; and when a time during which the power of the received signal is greater than a threshold, or a number of times the power of the received signal is greater than the threshold satisfies a first predetermined value, determining a message transmission is impossible on the first channel.

17 Claims, 20 Drawing Sheets

(51) Int. Cl.
*H04W 4/40* (2018.01)
*H04W 74/08* (2009.01)

(56) References Cited

U.S. PATENT DOCUMENTS

| | | | | |
|---|---|---|---|---|
| 10,469,185 | B2* | 11/2019 | Yerramalli | H04B 17/309 |
| 2006/0088056 | A1* | 4/2006 | Quigley | H04L 41/142 |
| | | | | 370/468 |
| 2007/0087756 | A1* | 4/2007 | Hoffberg | G06Q 10/0635 |
| | | | | 455/450 |
| 2009/0306881 | A1* | 12/2009 | Dolgov | G06K 9/6297 |
| | | | | 701/28 |
| 2010/0066587 | A1* | 3/2010 | Yamauchi | G01S 13/0209 |
| | | | | 342/70 |
| 2011/0224840 | A1* | 9/2011 | Vanek | G01S 7/4808 |
| | | | | 701/1 |
| 2012/0250532 | A1* | 10/2012 | Husted | H04W 74/0808 |
| | | | | 370/252 |
| 2015/0271808 | A1* | 9/2015 | Liang | H04L 69/14 |
| | | | | 370/329 |
| 2018/0324565 | A1* | 11/2018 | Belagal Math | H04W 4/46 |
| 2019/0118737 | A1* | 4/2019 | Li | H01P 1/067 |
| 2019/0159211 | A1* | 5/2019 | Belagal Math | H04W 28/0284 |
| 2019/0372706 | A1* | 12/2019 | Li | H04W 88/08 |
| 2020/0014086 | A1* | 1/2020 | Li | H01P 5/08 |
| 2020/0305167 | A1* | 9/2020 | Freda | H04L 1/1642 |

FOREIGN PATENT DOCUMENTS

| | | |
|---|---|---|
| KR | 10-2017-0080565 A | 7/2017 |
| KR | 10-2018-0041024 A | 4/2018 |
| KR | 10-2018-0042244 A | 4/2018 |
| KR | 10-1870751 B1 | 6/2018 |

\* cited by examiner

FIG. 12

| octets | 2 | 2 | 6 | 6 | 6 | 2 | 6 | 0 to 2312 | 4 |
|---|---|---|---|---|---|---|---|---|---|
| | FC | D/I | Address | Address | Address | SC | Address | Frame body | CRC |

FC = Frame control
D / I = Duration / Connection ID
SC = Sequence control

IEEE 802.11 MAC Frame format

MOBILE ITS STATION AND METHOD OF OPERATING THE SAME

CROSS-REFERENCE TO RELATED APPLICATIONS

Pursuant to 35 U.S.C. § 119(a), this application claims the benefit of earlier filing date and right of priority to PCT Application No. PCT/KR2018/009653 filed on Aug. 22, 2018, the contents of which are hereby incorporated by reference herein in their entirety.

BACKGROUND OF THE INVENTION

Field of the Invention

The present disclosure relates generally to a mobile intelligent transport system (ITS) station and a method of operating the same, and more particularly, to a method of determining a message transmission and reception state in a dedicated short-range communication (DSRC) interface, and controlling a mobile ITS station based on the determined message transmission and reception state.

Discussion of the Related Art

Traditionally, vehicles are a user transportation means. These days, some vehicles are equipped with various sensors and electronic devices to provide user convenience. Particularly, research has actively been conducted on an advanced driver assistance system (ADAS) to enhance user convenience. Further, autonomous vehicles are under active development.

The Institute of Electrical and Electronics Engineers (IEEE) developed wireless access in vehicular environment (WAVE) in 2010, and WAVE conceptually covers technical regulations for physical (PHY) and medium access control (MAC) layers for vehicular communication in IEEE 802.11p, and security, network management, etc. in IEEE 1609. A dedicated short range communication (DSRC) interface based on IEEE 802.11p and IEEE 1609 is an application for the intelligent transport system (ITS) related to road security.

In recent years, amateur radio-based drones equipped with a video transmitter (VTX) module have proliferated. Particularly, drones that transmit video content with transmit power of 200 mW to 600 mW in the 5.8 GHz to 5.9 GHz band used mainly by the DSRC interface have recently been discovered.

As predicted from FIG. 8, radio interference from a VTX module may cause a serious problem to a safety application supported by the DSRC interface. Particularly, the 5.860 GHz band used mainly by the VTX module is a band for a service channel (SCH) 172 on which safety-related messages are transmitted and received in the DSRC interface. Accordingly, since radio interference reduces the reliability of safety application service, the present disclosure provides a criterion for measuring and determining the radio interference, and a risk avoidance method.

As described before, with the recent discovery of a VTX module that may cause a problem to DSRC V2X transmission, ITS stations are vulnerable to communication interruption attacks. However, since conventional DSRC V2X message transmission relies on broadcasting, an acknowledgement (ACK) is not received for a transmitted message, and thus the transmission state is not checked. Moreover, only a channel busy ratio (CBR) is measured for congestion control and then used for clear channel assessment (CCA).

SUMMARY OF THE INVENTION

Accordingly, to substantially obviate one or more problems due to limitations and disadvantages of the related art, an aspect of the present disclosure is to provide a method of determining a message transmission and reception state in a dedicated short-range communication (DSRC) interface, and controlling a mobile intelligent transport system (ITS) station based on the determined message transmission and reception state.

To achieve these objects and other advantages and in accordance with the purpose of the disclosure, as embodied and broadly described herein, a method of determining a message transmission and reception state in a dedicated short-range communication (DSRC) interface, and controlling a mobile intelligent transport system (ITS) station based on the determined message transmission and reception state includes determining whether the power of a signal received on a first channel of the DSRC interface is greater than a threshold, and if a time during which the power of the received signal is greater than the threshold, or the number of times the power of the received signal is greater than the threshold satisfies a first predetermined value, determining that message transmission is impossible on the first channel.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 12 is a view illustrating another method of determining the transmission failure of a message by a processor of a mobile ITS station according to the first embodiment of the present disclosure;

DETAILED DESCRIPTION OF THE INVENTION

Figure 1:
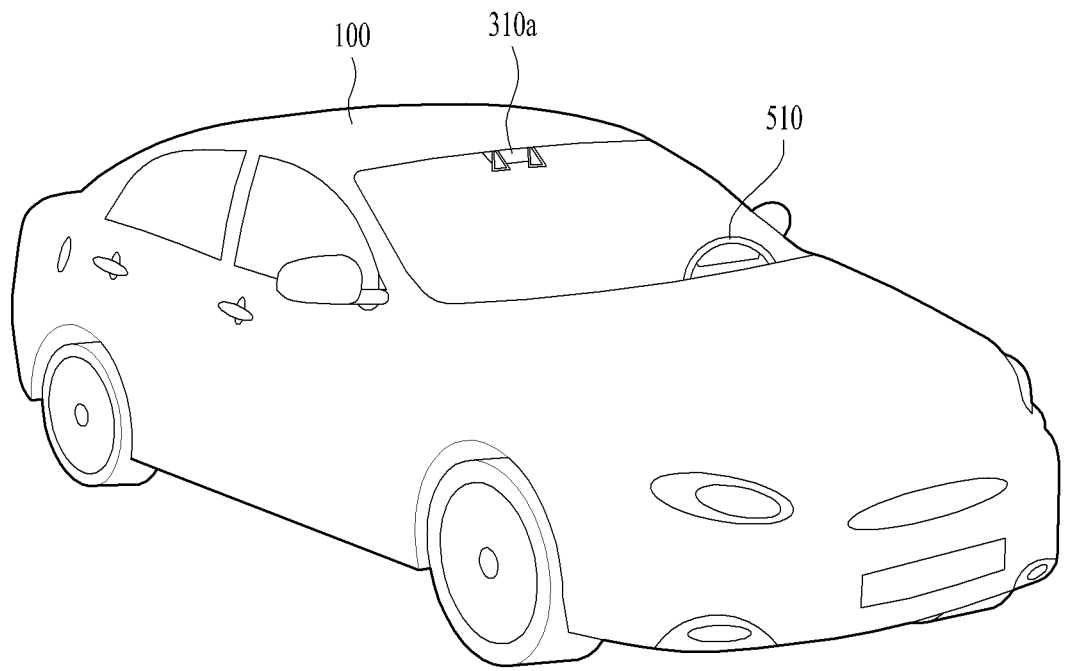
FIG. 1 is a view illustrating the external appearance of a vehicle according to an embodiment of the present disclosure.
Figure 1:
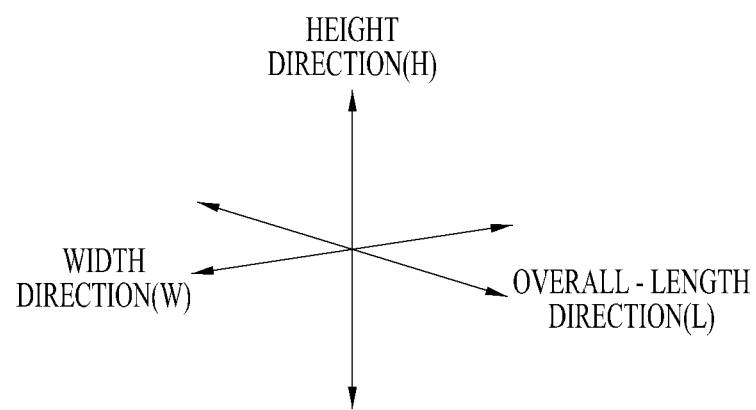
Figure 2:
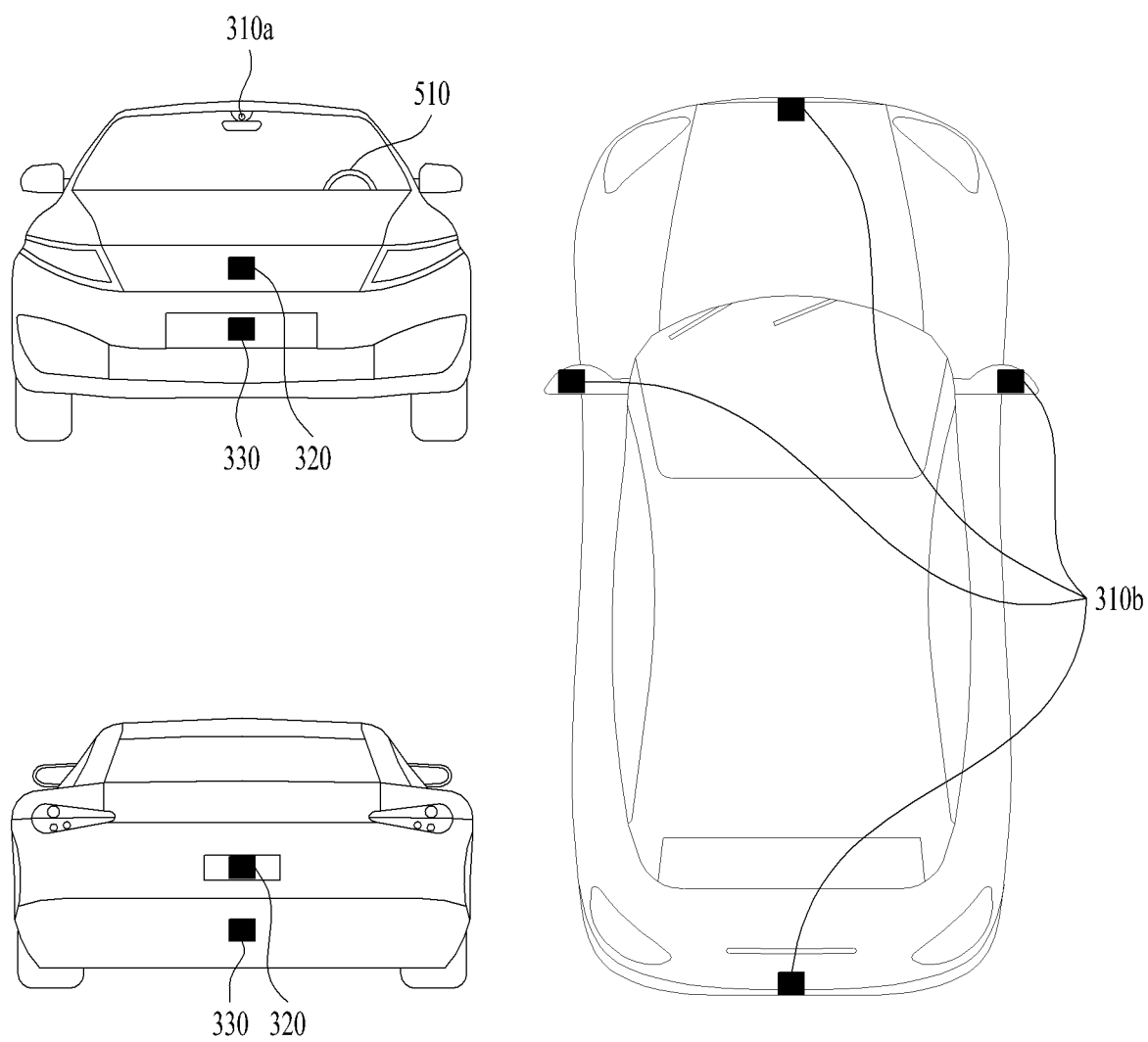
FIG. 2 are different angled views of the external appearance of a vehicle according to an embodiment of the present disclosure.
Figure 3:
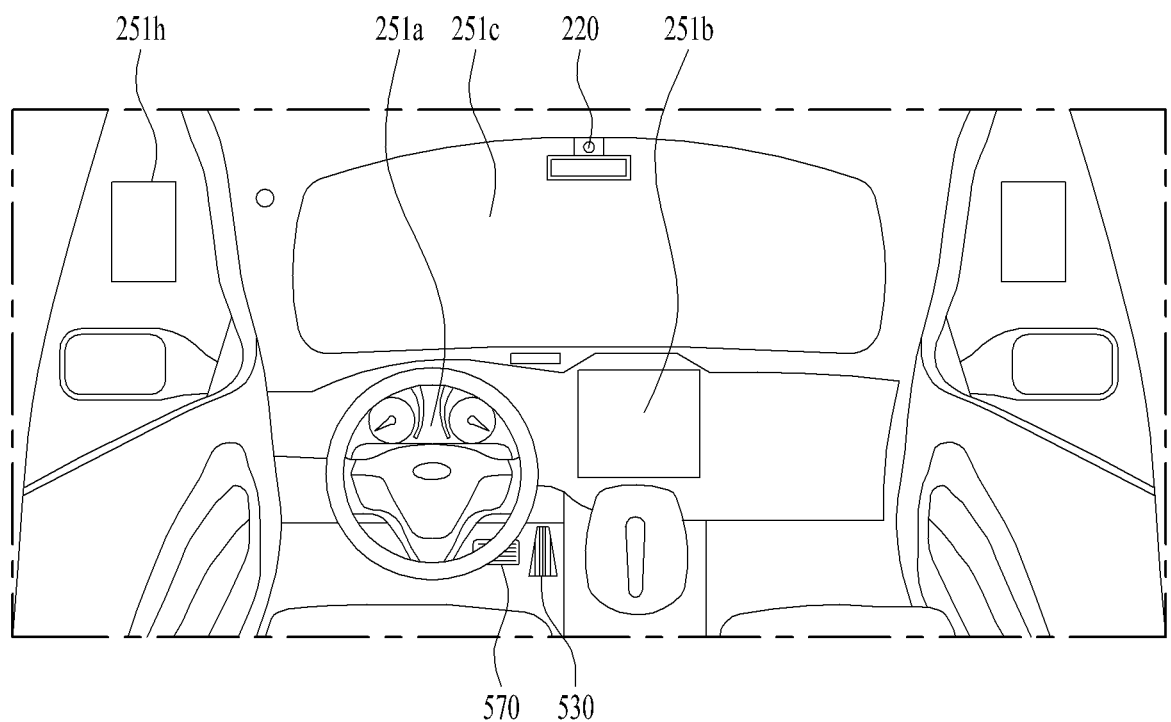
FIGS. 3 and 4 are views illustrating the interior configuration of a vehicle according to an embodiment of the present disclosure.
Figure 4:
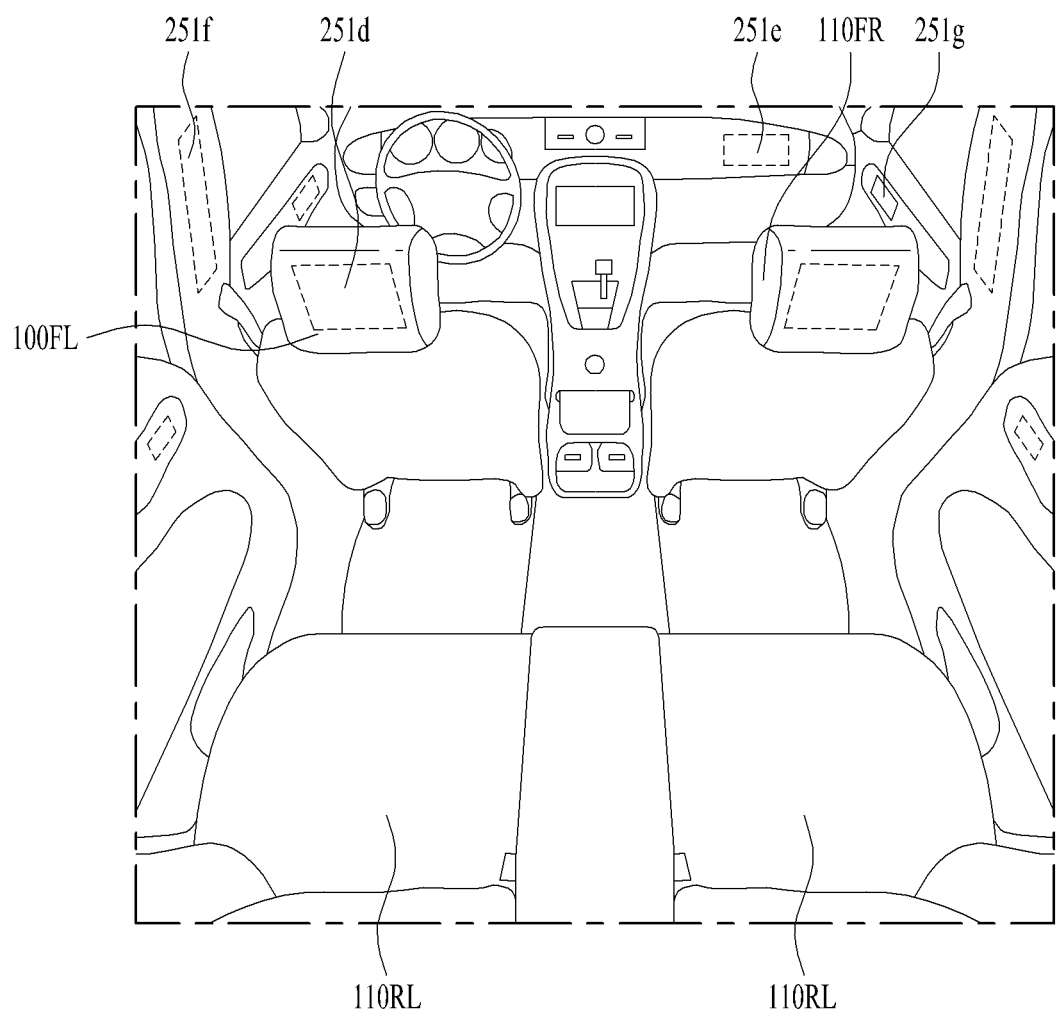

Reference will now be made in detail to preferred embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention. The following detailed description includes specific details to aid in comprehensive understanding of the present disclosure. However, it would be understood to those skilled in the art that the present disclosure can be implemented without such specific details.

Referring to FIGS. 1 to 7, a vehicle 100 may include a plurality of wheels, which are rotated by a power source, and a steering input device 510 for controlling a driving direction of the vehicle 100. The vehicle 100 may be an autonomous vehicle.

The vehicle 100 may be switched to an autonomous mode or a manual mode in response to a user input. For example, in response to a user input received through a user interface apparatus 200, the vehicle 100 may be switched from a manual mode to an autonomous mode, or vice versa. The vehicle 100 may be switched to the autonomous mode or to the manual mode based on driving environment information.

The driving environment information may include at least one of the following: information on an object outside a vehicle, navigation information, and vehicle state information. For example, the vehicle 100 may be switched from the manual mode to the autonomous mode, or vice versa, based on driving environment information generated by the object detection device 300. In another example, the vehicle 100 may be switched from the manual mode to the autonomous mode, or vice versa, based on driving environment information received through a communication device 400.

The vehicle 100 may be switched from the manual mode to the autonomous mode, or vice versa, based on information, data, and a signal provided from an external device.

When the vehicle 100 operates in the autonomous mode, the autonomous vehicle 100 may operate based on an operation system 700. For example, the autonomous vehicle 100 may operate based on information, data, or signals generated by a driving system 710, a vehicle pulling-out system 740, and a vehicle parking system 750.

While operating in the manual mode, the autonomous vehicle 100 may receive a user input for driving of the vehicle 100 through a maneuvering device 500. In response to the user input received through the maneuvering device 500, the vehicle 100 may operate.

The term "overall length" means the length from the front end to the rear end of the vehicle 100, the term "overall width" means the width of the vehicle 100, and the term "overall height" means the height from the bottom of the wheel to the roof. In the following description, the term "overall length direction L" may mean the reference direction for the measurement of the overall length of the vehicle 100, the term "overall width direction W" may mean the reference direction for the measurement of the overall width of the vehicle 100, and the term "overall height direction H" may mean the reference direction for the measurement of the overall height of the vehicle 100.

Figure 7:
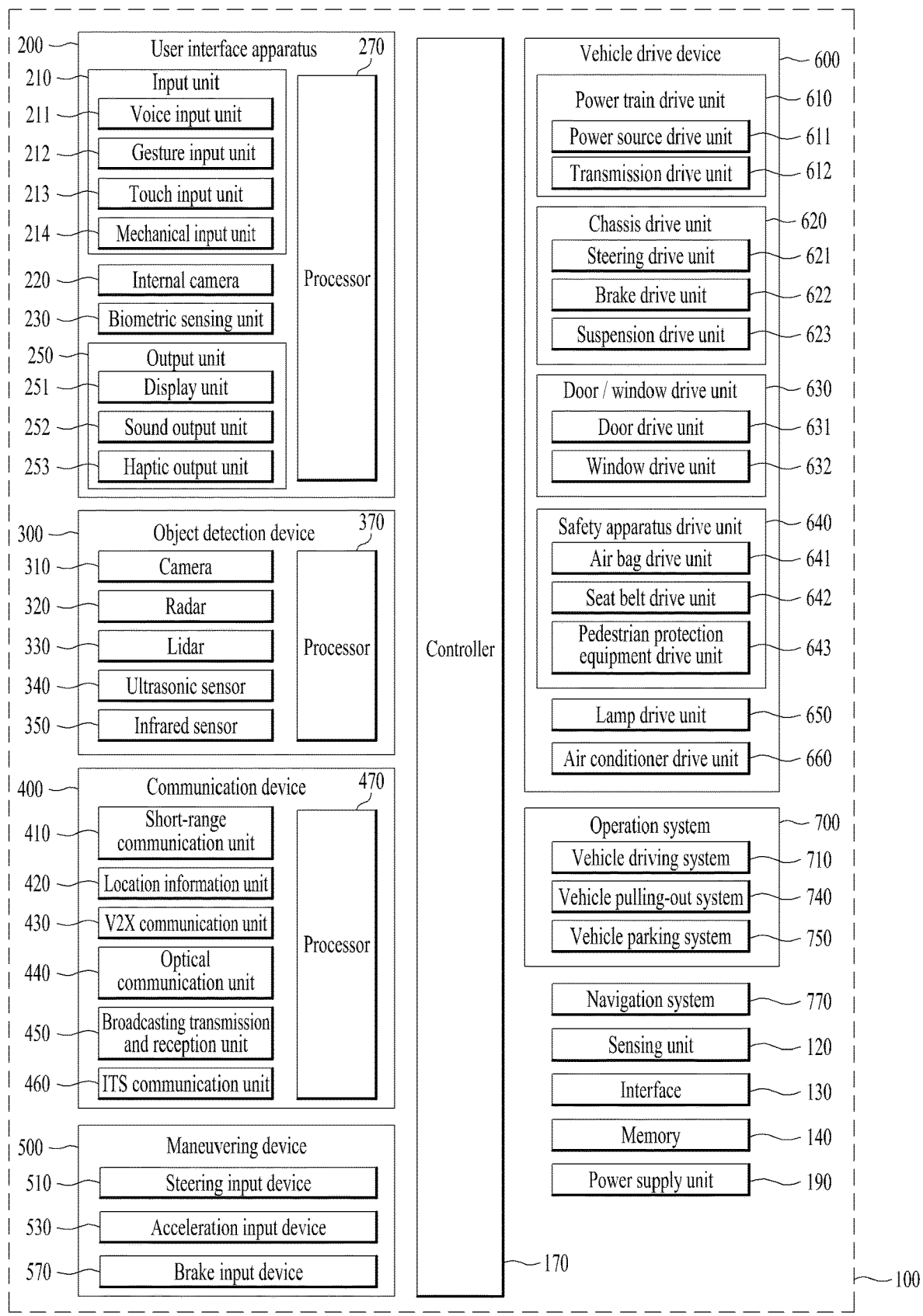
FIG. 7 is a block diagram illustrating a vehicle according to an embodiment of the present disclosure.

As illustrated in FIG. 7, the vehicle 100 may include the user interface device 200, the object detection device 300, the communication device 400, the maneuvering device 500, a vehicle drive device 600, the operation system 700, a navigation system 770, a sensing unit 120, an interface 130, a memory 140, a controller 170, and a power supply unit 190.

In some embodiments, the vehicle 100 may further include other components in addition to the aforementioned components, or may not include some of the aforementioned components. The sensing unit 120 may sense the state of the vehicle. The sensing unit 120 may include an attitude sensor (for example, a yaw sensor, a roll sensor, or a pitch sensor), a collision sensor, a wheel sensor, a speed sensor, a gradient sensor, a weight sensor, a heading sensor, a gyro sensor, a position module, a vehicle forward/reverse movement sensor, a battery sensor, a fuel sensor, a tire sensor, a steering sensor based on the rotation of the steering wheel, an in-vehicle temperature sensor, an in-vehicle humidity sensor, an ultrasonic sensor, an illumination sensor, an accelerator pedal position sensor, and a brake pedal position sensor.

The sensing unit 120 may acquire sensing signals with regard to, for example, vehicle attitude information, vehicle collision information, vehicle driving direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, steering-wheel rotation angle information, outside illumination information, information about the pressure applied to an accelerator pedal, and information about the pressure applied to a brake pedal.

The sensing unit 120 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 120 may generate vehicle state information based on sensing data. The vehicle condition information may be information that is generated based on data sensed by a variety of sensors inside a vehicle. For example, the vehicle state information may include vehicle position information, vehicle speed information, vehicle tilt information, vehicle weight information, vehicle direction information, vehicle battery information, vehicle fuel information, vehicle tire pressure information, vehicle steering information, in-vehicle temperature information, in-vehicle humidity information, pedal position information, vehicle engine temperature information, etc.

The interface 130 may serve as a passage for various kinds of external devices that are connected to the vehicle 100. For example, the interface 130 may have a port that is connectable to a mobile terminal and may be connected to the mobile terminal via the port. In this instance, the interface 130 may exchange data with the mobile terminal.

In addition, the interface 130 may serve as a passage for the supply of electrical energy to a mobile terminal connected thereto. When the mobile terminal is electrically connected to the interface 130, the interface 130 may provide electrical energy, supplied from the power supply unit 190, to the mobile terminal under control of the controller 170.

The memory 140 is electrically connected to the controller 170. The memory 140 may store basic data for each unit, control data for the operational control of each unit, and input/output data. The memory 140 may be any of various hardware storage devices, such as a ROM, a RAM, an EPROM, a flash drive, and a hard drive. The memory 140 may store various data for the overall operation of the vehicle 100, such as programs for the processing or control of the controller 170.

In some embodiments, the memory 140 may be integrally formed with the controller 170, or may be provided as an element of the controller 170. The controller 170 may control the overall operation of each unit inside the vehicle 100. The controller 170 may be referred to as an Electronic Controller (ECU).

The power supply unit 190 may supply power required to operate each component under control of the controller 170. In particular, the power supply unit 190 may receive power from, for example, a battery inside the vehicle 100. At least one processor and the controller 170 included in the vehicle 100 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

Further, each of the sensing unit 120, the interface unit 130, the memory 140, the power supply unit 190, the user interface device 200, the object detection device 300, the communication device 400, the maneuvering device 500, the vehicle drive device 600, the operation system 700, and the navigation system 770 may have an individual processor or may be incorporated in the controller 170.

The user interface device 200 is provided to support communication between the vehicle 100 and a user. The user interface device 200 may receive a user input, and provide information generated in the vehicle 100 to the user. The vehicle 100 may enable User Interfaces (UI) or User Experience (UX) through the user interface device 200.

The user interface device 200 may include an input unit 210, an internal camera 220, a biometric sensing unit 230, an output unit 250, and a processor 270. Each component of the user interface device 200 may be separated from or integrated with the afore-described interface 130, structurally or operatively. In some embodiments, the user interface device 200 may further include other components in addition to the aforementioned components, or may not include some of the aforementioned components.

The input unit 210 is configured to receive information from a user, and data collected in the input unit 210 may be analyzed by the processor 270 and then processed into a control command of the user. The input unit 210 may be disposed inside the vehicle 100. For example, the input unit 210 may be disposed in a region of a steering wheel, a region of an instrument panel, a region of a seat, a region of each pillar, a region of a door, a region of a center console, a region of a head lining, a region of a sun visor, a region of a windshield, or a region of a window.

The input unit 210 may include a voice input unit 211, a gesture input unit 212, a touch input unit 213, and a mechanical input unit 214. The voice input unit 211 may convert a voice input of a user into an electrical signal. The converted electrical signal may be provided to the processor 270 or the controller 170. The voice input unit 211 may include one or more microphones.

The gesture input unit 212 may convert a gesture input of a user into an electrical signal. The converted electrical signal may be provided to the processor 270 or the controller 170. The gesture input unit 212 may include at least one selected from among an infrared sensor and an image sensor for sensing a gesture input of a user.

In some embodiments, the gesture input unit 212 may sense a three-dimensional (3D) gesture input of a user. Thus, the gesture input unit 212 may include a plurality of light emitting units for outputting infrared light, or a plurality of image sensors. The gesture input unit 212 may sense the 3D gesture input by employing a time of flight (TOF) scheme, a structured light scheme, or a disparity scheme.

The touch input unit 213 may convert a user's touch input into an electrical signal. The converted electrical signal may be provided to the processor 270 or the controller 170. The touch input unit 213 may include a touch sensor for sensing a touch input of a user. In some embodiments, the touch input unit 210 may be formed integral with a display unit 251 to implement a touch screen. The touch screen may provide an input interface and an output interface between the vehicle 100 and the user.

The mechanical input unit 214 may include at least one selected from among a button, a dome switch, a jog wheel, and a jog switch. An electrical signal generated by the mechanical input unit 214 may be provided to the processor 270 or the controller 170. The mechanical input unit 214 may be located on a steering wheel, a center fascia, a center console, a cockpit module, a door, etc.

The processor 270 may start a learning mode of the vehicle 100 in response to a user input to at least one of the afore-described voice input unit 211, gesture input unit 212, touch input unit 213, or mechanical input unit 214. In the learning mode, the vehicle 100 may learn a driving route and ambient environment of the vehicle 100. The learning mode will be described later in detail in relation to the object detection device 300 and the operation system 700.

The internal camera 220 may acquire images of the inside of the vehicle 100. The processor 270 may sense a user's condition based on the images of the inside of the vehicle 100. The processor 270 may acquire information on an eye gaze of the user. The processor 270 may sense a gesture of the user from the images of the inside of the vehicle 100.

The biometric sensing unit 230 may acquire biometric information of the user. The biometric sensing unit 230 may include a sensor for acquire biometric information of the user, and may utilize the sensor to acquire finger print information, heart rate information, etc. of the user. The biometric information may be used for user authentication.

The output unit 250 is configured to generate a visual, audio, or tactile output. The output unit 250 may include at least one selected from among a display unit 251, a sound output unit 252, and a haptic output unit 253. The display unit 251 may display graphic objects corresponding to various types of information.

The display unit 251 may include at least one selected from among a Liquid Crystal Display (LCD), a Thin Film Transistor-Liquid Crystal Display (TFT LCD), an Organic Light-Emitting Diode (OLED), a flexible display, a 3D display, and an e-ink display. The display unit 251 may form an inter-layer structure together with the touch input unit 213, or may be integrally formed with the touch input unit 213 to implement a touch screen.

The display unit 251 may be implemented as a Head Up Display (HUD). When implemented as a HUD, the display unit 251 may include a projector module in order to output information through an image projected on a windshield or a window.

The display unit 251 may include a transparent display. The transparent display may be attached on the windshield or the window. The transparent display may display a predetermined screen with a predetermined transparency. In order to achieve the transparency, the transparent display may include at least one selected from among a transparent Thin Film Electroluminescent (TFEL) display, an Organic Light Emitting Diode (OLED) display, a transparent Liquid Crystal Display (LCD), a transmissive transparent display, and a transparent Light Emitting Diode (LED) display. The transparency of the transparent display may be adjustable.

In addition, the user interface device 200 may include a plurality of display units 251*a* to 251*g*. The display unit 251 may be disposed in a region of a steering wheel, a region 251*a*, 251*b* or 251*e* of an instrument panel, a region 251*d* of a seat, a region 251*f* of each pillar, a region 251*g* of a door, a region of a center console, a region of a head lining, a region of a sun visor, a region 251*c* of a windshield, or a region 251*h* of a window.

The sound output unit 252 converts an electrical signal from the processor 270 or the controller 170 into an audio signal, and outputs the audio signal. Thus, the sound output unit 252 may include one or more speakers.

The haptic output unit 253 generates a tactile output. For example, the haptic output unit 253 may operate to vibrate a steering wheel, a safety belt, and seats 110FL, 110FR, 110RL, and 110RR so as to allow a user to recognize the output. The processor 270 may control the overall operation of each unit of the user interface device 200.

In some embodiments, the user interface device 200 may include a plurality of processors 270 or may not include the processor 270. When the user interface device 200 does not include the processor 270, the user interface device 200 may operate under control of the controller 170 or a processor of a different device inside the vehicle 100.

In addition, the user interface device 200 may be referred to as a display device for a vehicle. The user interface device 200 may operate under control of the controller 170. The object detection device 300 is used to detect an object outside the vehicle 100. The object detection device 300 may generate object information based on sensing data.

The object information may include information about the presence of an object, location information of the object, information on distance between the vehicle and the object, and the speed of the object relative to the vehicle 100. The object may include various objects related to travelling of the vehicle 100.

Figure 5:
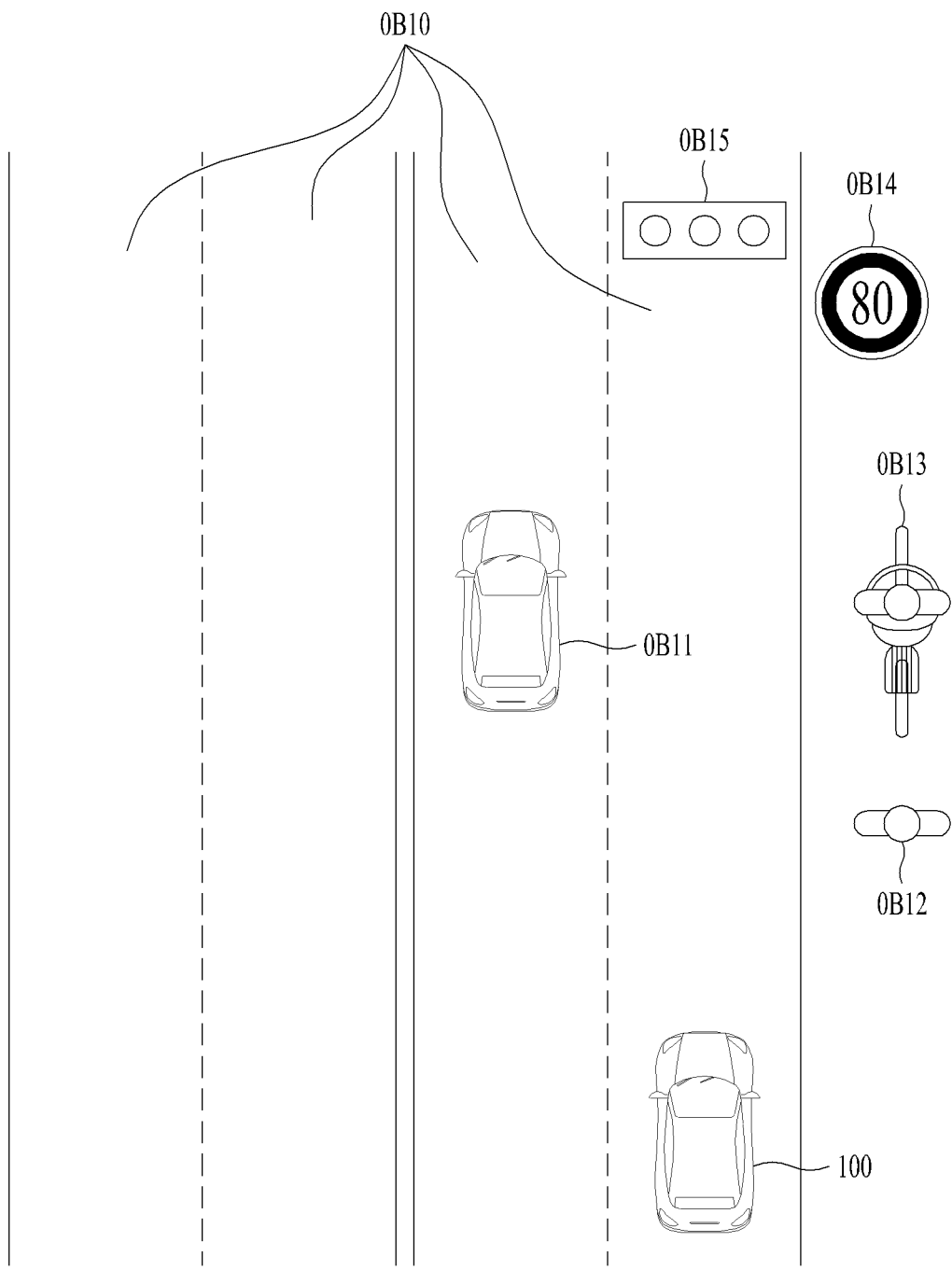
FIGS. 5 and 6 are views illustrating an object according to an embodiment of the present disclosure.
Figure 6:
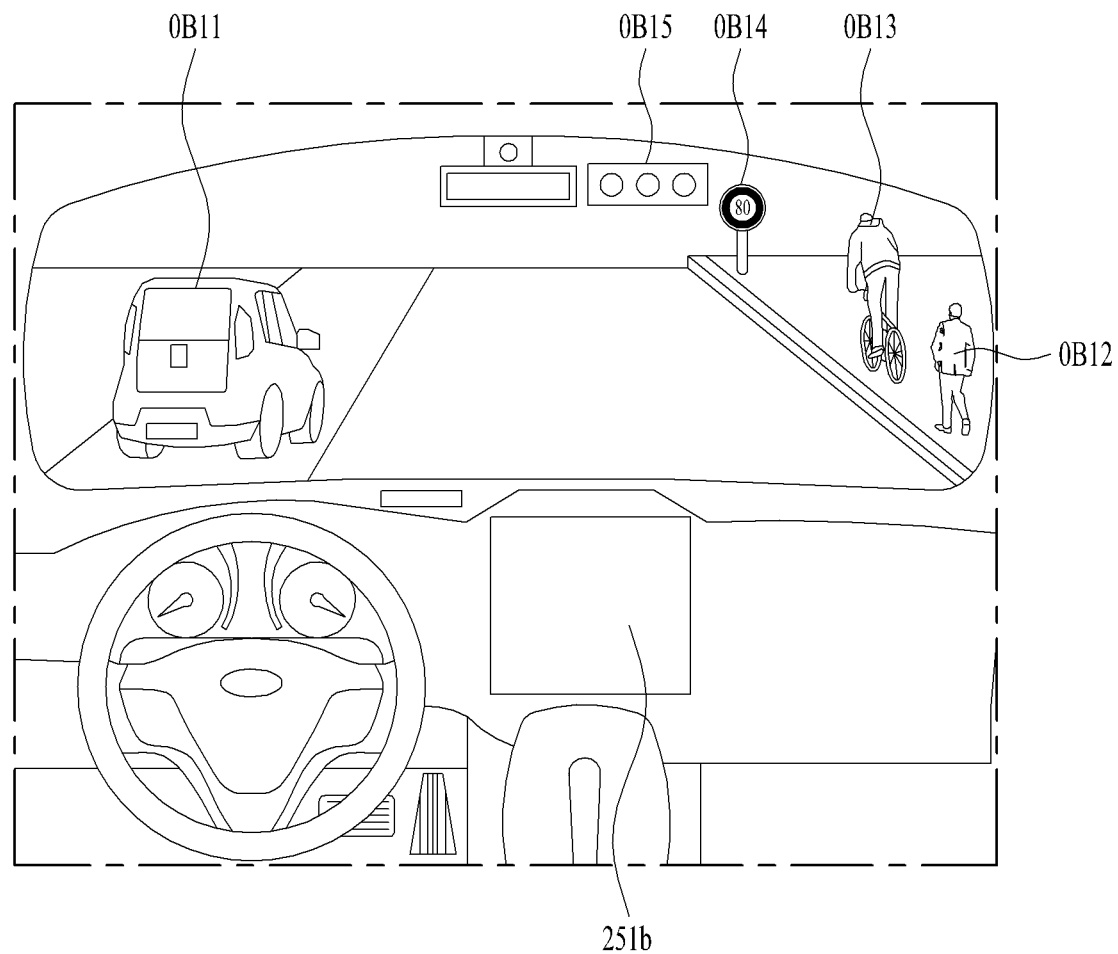

Referring to FIGS. 5 and 6, an object o may include a lane OB10, a nearby vehicle OB11, a pedestrian OB12, a two-wheeled vehicle OB13, a traffic signal OB14 and OB15, a light, a road, a structure, a bump, a geographical feature, an animal, etc. The lane OB10 may be a lane in which the vehicle 100 is traveling (hereinafter, referred to as the current driving lane), a lane next to the current driving lane, and a lane in which a vehicle travelling in the opposite direction is travelling. The lane OB10 may include left and right lines that define the lane.

The nearby vehicle OB11 may be a vehicle that is travelling in the vicinity of the vehicle 100. The nearby vehicle OB11 may be a vehicle within a predetermined distance from the vehicle 100. For example, the nearby vehicle OB11 may be a vehicle that is preceding or following the vehicle 100. The pedestrian OB12 may be a person in the vicinity of the vehicle 100. The pedestrian OB12 may be a person within a predetermined distance from the vehicle 100. For example, the pedestrian OB12 may be a person on a sidewalk or on the roadway.

The two-wheeled vehicle OB13 is a vehicle that is located in the vicinity of the vehicle 100 and moves with two wheels. The two-wheeled vehicle OB13 may be a vehicle that has two wheels within a predetermined distance from the vehicle 100. For example, the two-wheeled vehicle OB13 may be a motorcycle or a bike on a sidewalk or the roadway.

The traffic signal may include a traffic light OB15, a traffic sign plate OB14, and a pattern or text painted on a road surface. The light may be light generated by a lamp provided in the nearby vehicle. The light may be light generated by a street light. The light may be solar light. The road may include a road surface, a curve, and slopes, such as an upward slope and a downward slope.

The structure may be a body located around the road in the state of being fixed onto the ground. For example, the structure may include a streetlight, a roadside tree, a building, a traffic light, and a bridge. The geographical feature may include a mountain and a hill.

In addition, the object may be classified as a movable object or a stationary object. For example, the movable object may include a nearby vehicle and a pedestrian. For example, the stationary object may include a traffic signal, a road, and a structure. The object detection device 300 may include a camera 310, a radar 320, a lidar 330, an ultrasonic sensor 340, an infrared sensor 350, and a processor 370. Each component of the object detection device may be separated from or integrated with the sensing unit, structurally or operatively.

In some embodiments, the object detection device 300 may further include other components in addition to the aforementioned components, or may not include some of the aforementioned components. The camera 310 may be located at an appropriate position outside the vehicle 100 in order to acquire images of the outside of the vehicle 100. The camera 310 may be a mono camera, a stereo camera 310*a*, an around view monitoring (AVM) camera 310*b*, or a 360-degree camera.

Using various image processing algorithms, the camera 310 may acquire location information of an object, information on distance to the object, and information on speed relative to the object. For example, based on change in size over time of an object in acquired images, the camera 310 may acquire information on distance to the object and information on speed relative to the object. For example, the camera 310 may acquire the information on distance to the object and the information on speed relative to the object by utilizing a pin hole model or by profiling a road surface.

For example, the camera 310 may acquire the information on distance to the object and the information on the speed relative to the object, based on information on disparity of stereo images acquired by a stereo camera 310a. For example, the camera 310 may be disposed near a front windshield in the vehicle 100 in order to acquire images of the front of the vehicle 100. Alternatively, the camera 310 may be disposed around a front bumper or a radiator grill.

In another example, the camera 310 may be disposed near a rear glass in the vehicle 100 in order to acquire images of the rear of the vehicle 100. Alternatively, the camera 310 may be disposed around a rear bumper, a trunk, or a tailgate. In yet another example, the camera 310 may be disposed near at least one of the side windows in the vehicle 100 in order to acquire images of the side of the vehicle 100. Alternatively, the camera 310 may be disposed around a side mirror, a fender, or a door.

The camera 310 may provide an acquired image to the processor 370. The radar 320 may include an electromagnetic wave transmission unit and an electromagnetic wave reception unit. The radar 320 may be realized as a pulse radar or a continuous wave radar depending on the principle of emission of an electronic wave. In addition, the radar 320 may be realized as a Frequency Modulated Continuous Wave (FMCW) type radar or a Frequency Shift Keying (FSK) type radar depending on the waveform of a signal.

The radar 320 may detect an object through the medium of an electromagnetic wave by employing a time of flight (TOF) scheme or a phase-shift scheme, and may detect a location of the detected object, the distance to the detected object, and the speed relative to the detected object. The radar 320 may be located at an appropriate position outside the vehicle 100 in order to sense an object located in front of the vehicle 100, an object located to the rear of the vehicle 100, or an object located to the side of the vehicle 100.

The lidar 330 may include a laser transmission unit and a laser reception unit. The lidar 330 may be implemented by the TOF scheme or the phase-shift scheme. The lidar 330 may be implemented as a drive type lidar or a non-drive type lidar. When implemented as the drive type lidar, the lidar 300 may rotate by a motor and detect an object in the vicinity of the vehicle 100.

When implemented as the non-drive type lidar, the lidar 300 may utilize a light steering technique to detect an object located within a predetermined distance from the vehicle 100. The lidar 330 may detect an object through the medium of laser light by employing the TOF scheme or the phase-shift scheme, and may detect a location of the detected object, the distance to the detected object, and the speed relative to the detected object.

The lidar 330 may be located at an appropriate position outside the vehicle 100 in order to sense an object located in front of the vehicle 100, an object located to the rear of the vehicle 100, or an object located to the side of the vehicle 100. The ultrasonic sensor 340 may include an ultrasonic wave transmission unit and an ultrasonic wave reception unit. The ultrasonic sensor 340 may detect an object based on an ultrasonic wave, and may detect a location of the detected object, the distance to the detected object, and the speed relative to the detected object.

The ultrasonic sensor 340 may be located at an appropriate position outside the vehicle 100 in order to detect an object located in front of the vehicle 100, an object located to the rear of the vehicle 100, and an object located to the side of the vehicle 100. The infrared sensor 350 may include an infrared light transmission unit and an infrared light reception unit. The infrared sensor 340 may detect an object based on infrared light, and may detect a location of the detected object, the distance to the detected object, and the speed relative to the detected object.

The infrared sensor 350 may be located at an appropriate position outside the vehicle 100 in order to sense an object located in front of the vehicle 100, an object located to the rear of the vehicle 100, or an object located to the side of the vehicle 100. The processor 370 may control the overall operation of each unit of the object detection device 300.

The processor 370 may detect or classify an object by comparing data sensed by the camera 310, the radar 320, the lidar 330, the ultrasonic sensor 340, and the infrared sensor 350 with pre-stored data. The processor 370 may detect and track an object based on acquired images. The processor 370 may, for example, calculate the distance to the object and the speed relative to the object. For example, the processor 370 may acquire information on the distance to the object and information on the speed relative to the object based on a variation in size over time of the object in acquired images.

In another example, the processor 370 may acquire information on the distance to the object or information on the speed relative to the object by employing a pin hole model or by profiling a road surface. In yet another example, the processor 370 may acquire information on the distance to the object and information on the speed relative to the object based on information on disparity of stereo images acquired from the stereo camera 310a.

The processor 370 may detect and track an object based on a reflection electromagnetic wave which is formed as a result of reflection a transmission electromagnetic wave by the object. Based on the electromagnetic wave, the processor 370 may, for example, calculate the distance to the object and the speed relative to the object. The processor 370 may detect and track an object based on a reflection laser light which is formed as a result of reflection of transmission laser by the object. Based on the laser light, the processor 370 may, for example, calculate the distance to the object and the speed relative to the object.

The processor 370 may detect and track an object based on a reflection ultrasonic wave which is formed as a result of reflection of a transmission ultrasonic wave by the object. Based on the ultrasonic wave, the processor 370 may, for example, calculate the distance to the object and the speed relative to the object. The processor 370 may detect and track an object based on reflection infrared light which is formed as a result of reflection of transmission infrared light by the object. Based on the infrared light, the processor 370 may, for example, calculate the distance to the object and the speed relative to the object.

As described before, once the vehicle 100 starts the learning mode in response to a user input to the input unit 210, the processor 370 may store data sensed by the camera 310, the radar 320, the lidar 330, the ultrasonic sensor 340, and the infrared sensor 350 in the memory 140. Each step of the learning mode based on analysis of stored data, and an operating mode following the learning mode will be described later in detail in relation to the operation system 700. According to an embodiment, the object detection device 300 may include a plurality of processors 370 or no processor 370. For example, the camera 310, the radar 320, the lidar 330, the ultrasonic sensor 340, and the infrared sensor 350 may include individual processors.

When the object detection device 300 does not include the processor 370, the object detection device 300 may operate under control of the controller 170 or a processor inside the vehicle 100. The object detection device 300 may operate under control of the controller 170. The communication device 400 is configured to perform communication with an external device. Here, the external device may be a nearby vehicle, a mobile terminal, or a server.

To perform communication, the communication device 400 may include at least one selected from among a transmission antenna, a reception antenna, a Radio Frequency (RF) circuit capable of implementing various communication protocols, and an RF device. The communication device 400 may include a short-range communication unit 410, a location information unit 420, a V2X communication unit 430, an optical communication unit 440, a broadcast transmission and reception unit 450, an Intelligent Transport Systems (ITS) communication unit 460, and a processor 470.

In some embodiments, the communication device 400 may further include other components in addition to the aforementioned components, or may not include some of the aforementioned components. The short-range communication unit 410 is configured to perform short-range communication. The short-range communication unit 410 may support short-range communication using at least one selected from among Bluetooth™, Radio Frequency IDdentification (RFID), Infrared Data Association (IrDA), Ultra-WideBand (UWB), ZigBee, Near Field Communication (NFC), Wireless-Fidelity (Wi-Fi), Wi-Fi Direct, and Wireless USB (Wireless Universal Serial Bus).

The short-range communication unit 410 may form wireless area networks to perform short-range communication between the vehicle 100 and at least one external device. The location information unit 420 is configured to acquire location information of the vehicle 100. For example, the location information unit 420 may include a Global Positioning System (GPS) module or a Differential Global Positioning System (DGPS) module.

The V2X communication unit 430 is configured to perform wireless communication between a vehicle and a server (that is, vehicle to infra (V2I) communication), wireless communication between a vehicle and a nearby vehicle (that is, vehicle to vehicle (V2V) communication), or wireless communication between a vehicle and a pedestrian (that is, vehicle to pedestrian (V2P) communication).

The optical communication unit 440 is configured to perform communication with an external device through the medium of light. The optical communication unit 440 may include a light emitting unit, which converts an electrical signal into an optical signal and transmits the optical signal to the outside, and a light receiving unit which converts a received optical signal into an electrical signal. In some embodiments, the light emitting unit may be integrally formed with a lamp provided included in the vehicle 100.

The broadcast transmission and reception unit 450 is configured to receive a broadcast signal from an external broadcasting management server or transmit a broadcast signal to the broadcasting management server through a broadcasting channel. The broadcasting channel may include a satellite channel, and a terrestrial channel. The broadcast signal may include a TV broadcast signal, a radio broadcast signal, and a data broadcast signal.

The ITS communication unit 460 may exchange information, data, or signals with a traffic system. The ITS communication unit 460 may provide acquired information or data to the traffic system. The ITS communication unit 460 may receive information, data, or signals from the traffic system. For example, the ITS communication unit 460 may receive traffic information from the traffic system and provide the traffic information to the controller 170. In another example, the ITS communication unit 460 may receive a control signal from the traffic system, and provide the control signal to the controller 170 or a processor provided in the vehicle 100.

The processor 470 may control the overall operation of each unit of the communication device 400. In some embodiments, the communication device 400 may include a plurality of processors 470, or may not include the processor 470. When the communication device 400 does not include the processor 470, the communication device 400 may operate under control of the controller 170 or a processor of a device inside of the vehicle 100.

In addition, the communication device 400 may implement a vehicle display device, together with the user interface device 200. In this instance, the vehicle display device may be referred to as a telematics device or an audio video navigation (AVN) device. The communication device 400 may operate under control of the controller 170. The maneuvering device 500 is configured to receive a user input for driving the vehicle 100.

In the manual mode, the vehicle 100 may operate based on a signal provided by the maneuvering device 500. The maneuvering device 500 may include a steering input device 510, an acceleration input device 530, and a brake input device 570. The steering input device 510 may receive a user input with regard to the direction of travel of the vehicle 100. The steering input device 510 may take the form of a wheel to enable a steering input through the rotation thereof. In some embodiments, the steering input device may be provided as a touchscreen, a touch pad, or a button.

The acceleration input device 530 may receive a user input for acceleration of the vehicle 100. The brake input device 570 may receive a user input for deceleration of the vehicle 100. Each of the acceleration input device 530 and the brake input device 570 may take the form of a pedal. In some embodiments, the acceleration input device or the break input device may be configured as a touch screen, a touch pad, or a button.

The maneuvering device 500 may operate under control of the controller 170. The vehicle drive device 600 is configured to electrically control the operation of various devices of the vehicle 100. The vehicle drive device 600 may include a power train drive unit 610, a chassis drive unit 620, a door/window drive unit 630, a safety apparatus drive unit 640, a lamp drive unit 650, and an air conditioner drive unit 660.

In some embodiments, the vehicle drive device 600 may further include other components in addition to the aforementioned components, or may not include some of the aforementioned components. In addition, the vehicle drive device 600 may include a processor. Each unit of the vehicle drive device 600 may include its own processor.

The power train drive unit 610 may control the operation of a power train. The power train drive unit 610 may include a power source drive unit 611 and a transmission drive unit 612. The power source drive unit 611 may control a power source of the vehicle 100.

When a fossil fuel-based engine is the power source, the power source drive unit 611 may perform electronic control of the engine. As such the power source drive unit 611 may control, for example, the output torque of the engine. The power source drive unit 611 may adjust the output toque of the engine under control of the controller 170.

When an electric motor is the power source, the power source drive unit 611 may control the motor. The power source drive unit 610 may control, for example, the RPM and toque of the motor under control of the controller 170. The transmission drive unit 612 may control a transmission. The transmission drive unit 612 may adjust the state of the transmission. The transmission drive unit 612 may adjust a state of the transmission to a drive (D), reverse (R), neutral (N), or park (P) state.

In addition, when an engine is the power source, the transmission drive unit 612 may adjust a gear-engaged state to the drive position D. The chassis drive unit 620 may control the operation of a chassis. The chassis drive unit 620 may include a steering drive unit 621, a brake drive unit 622, and a suspension drive unit 623.

The steering drive unit 621 may perform electronic control of a steering apparatus provided inside the vehicle 100. The steering drive unit 621 may change the direction of travel of the vehicle 100. The brake drive unit 622 may perform electronic control of a brake apparatus provided inside the vehicle 100. For example, the brake drive unit 622 may reduce the speed of the vehicle 100 by controlling the operation of a brake located at a wheel.

In addition, the brake drive unit 622 may control a plurality of brakes individually. The brake drive unit 622 may apply a different degree-braking force to each wheel. The suspension drive unit 623 may perform electronic control of a suspension apparatus inside the vehicle 100. For example, when the road surface is uneven, the suspension drive unit 623 may control the suspension apparatus so as to reduce the vibration of the vehicle 100.

In addition, the suspension drive unit 623 may control a plurality of suspensions individually. The door/window drive unit 630 may perform electronic control of a door apparatus or a window apparatus inside the vehicle 100. The door/window drive unit 630 may include a door drive unit 631 and a window drive unit 632.

The door drive unit 631 may control the door apparatus. The door drive unit 631 may control opening or closing of a plurality of doors included in the vehicle 100. The door drive unit 631 may control opening or closing of a trunk or a tail gate. The door drive unit 631 may control opening or closing of a sunroof. The window drive unit 632 may perform electronic control of the window apparatus. The window drive unit 632 may control opening or closing of a plurality of windows included in the vehicle 100.

The safety apparatus drive unit 640 may perform electronic control of various safety apparatuses provided inside the vehicle 100. The safety apparatus drive unit 640 may include an airbag drive unit 641, a safety belt drive unit 642, and a pedestrian protection equipment drive unit 643. The airbag drive unit 641 may perform electronic control of an airbag apparatus inside the vehicle 100. For example, upon detection of a dangerous situation, the airbag drive unit 641 may control an airbag to be deployed.

The safety belt drive unit 642 may perform electronic control of a seatbelt apparatus inside the vehicle 100. For example, upon detection of a dangerous situation, the safety belt drive unit 642 may control passengers to be fixed onto seats 110FL, 110FR, 110RL, and 110RR with safety belts.

The pedestrian protection equipment drive unit 643 may perform electronic control of a hood lift and a pedestrian airbag. For example, upon detection of a collision with a pedestrian, the pedestrian protection equipment drive unit 643 may control a hood lift and a pedestrian airbag to be deployed. The lamp drive unit 650 may perform electronic control of various lamp apparatuses provided inside the vehicle 100.

The air conditioner drive unit 660 may perform electronic control of an air conditioner inside the vehicle 100. For example, when the inner temperature of the vehicle 100 is high, an air conditioner drive unit 660 may operate the air conditioner so as to supply cool air to the inside of the vehicle 100.

The vehicle drive device 600 may include a processor. Each unit of the vehicle dive device 600 may include its own processor. The vehicle drive device 600 may operate under control of the controller 170. The operation system 700 is a system for controlling the overall driving operation of the vehicle 100. The operation system 700 may operate in the autonomous driving mode.

The operation system 700 may include the driving system 710, the vehicle pulling-out system 740, and the vehicle parking system 750. In some embodiments, the operation system 700 may further include other components in addition to the aforementioned components, or may not include some of the aforementioned component.

In addition, the operation system 700 may include a processor. Each unit of the operation system 700 may include its own processor. In addition, the operation system 700 may control driving in the autonomous mode based on learning. In this instance, the learning mode and an operating mode based on the premise of completion of learning may be performed. A description will be given below of a method of executing the learning mode and the operating mode by the processor of the operation system 700.

The learning mode may be performed in the afore-described manual mode. In the learning mode, the processor of the operation system 700 may learn a driving route and ambient environment of the vehicle 100. The learning of the driving route may include generating map data for a route in which the vehicle 100 drives. Particularly, the processor of the operation system 700 may generate map data based on information detected through the object detection device 300 during driving from a departure to a destination.

The learning of the ambient environment may include storing and analyzing information about an ambient environment of the vehicle 100 during driving and parking. Particularly, the processor of the operation system 700 may store and analyze the information about the ambient environment of the vehicle based on information detected through the object detection device 300 during parking of the vehicle 100, for example, information about a location, size, and a fixed (or mobile) obstacle of a parking space.

The operating mode may be performed in the afore-described autonomous mode. The operating mode will be described based on the premise that the driving route or the ambient environment has been learned in the learning mode. The operating mode may be performed in response to a user input through the input unit 210, or when the vehicle 100 reaches the learned driving route and parking space, the operating mode may be performed automatically.

The operating mode may include a semi-autonomous operating mode requiring some user's manipulations of the maneuvering device 500, and a full autonomous operating mode requiring no user's manipulation of the maneuvering device 500. According to an embodiment, the processor of the operation system 700 may drive the vehicle 100 along the learned driving route by controlling the operation system 710 in the operating mode.

According to an embodiment, the processor of the operation system 700 may pull out the vehicle 100 from the learned parking space by controlling the vehicle pulling-out system 740 in the operating mode. According to an embodiment, the processor of the operation system 700 may park the vehicle 100 in the learned parking space by controlling the vehicle parking system 750 in the operating mode. In addition, in some embodiments, when the operation system 700 is implemented as software, the operation system 700 may be a subordinate concept of the controller 170.

In addition, in some embodiments, the operation system 700 may be a concept including at least one selected from among the user interface device 200, the object detection device 300, the communication device 400, the vehicle drive device 600, and the controller 170. The driving system 710 may perform driving of the vehicle 100.

The driving system 710 may perform driving of the vehicle 100 by providing a control signal to the vehicle drive device 600 in response to reception of navigation information from the navigation system 770. The driving system 710 may perform driving of the vehicle 100 by providing a control signal to the vehicle drive device 600 in response to reception of object information from the object detection device 300.

The driving system 710 may perform driving of the vehicle 100 by providing a control signal to the vehicle drive device 600 in response to reception of a signal from an external device through the communication device 400. Conceptually, the driving system 710 may be a system that drives the vehicle 100, including at least one of the user interface device 200, the object detection device 300, the communication device 400, the maneuvering device 500, the vehicle drive device 600, the navigation system 770, the sensing unit 120, or the controller 170. The driving system 710 may be referred to as a vehicle driving control device.

The vehicle pulling-out system 740 may perform an operation of pulling the vehicle 100 out of a parking space. The vehicle pulling-out system 740 may perform an operation of pulling the vehicle 100 out of a parking space, by providing a control signal to the vehicle drive device 600 in response to reception of navigation information from the navigation system 770.

The vehicle pulling-out system 740 may perform an operation of pulling the vehicle 100 out of a parking space, by providing a control signal to the vehicle drive device 600 in response to reception of object information from the object detection device 300.

The vehicle pulling-out system 740 may perform an operation of pulling the vehicle 100 out of a parking space, by providing a control signal to the vehicle drive device 600 in response to reception of a signal from an external device. Conceptually, the vehicle pulling-out system 740 may be a system that performs pulling-out of the vehicle 100, including at least one of the user interface device 200, the object detection device 300, the communication device 400, the maneuvering device 500, the vehicle drive device 600, the navigation system 770, the sensing unit 120, or the controller 170.

The vehicle pulling-out system 740 may be referred to as a vehicle pulling-out control device. The vehicle parking system 750 may perform an operation of parking the vehicle 100 in a parking space. The vehicle parking system 750 may perform an operation of parking the vehicle 100 in a parking space, by providing a control signal to the vehicle drive device 600 in response to reception of navigation information from the navigation system 770.

The vehicle parking system 750 may perform an operation of parking the vehicle 100 in a parking space, by providing a control signal to the vehicle drive device 600 in response to reception of object information from the object detection device 300. The vehicle parking system 750 may perform an operation of parking the vehicle 100 in a parking space, by providing a control signal to the vehicle drive device 600 in response to reception of a signal from an external device.

Conceptually, the vehicle parking system 750 may be a system that performs parking of the vehicle 100, including at least one of the user interface device 200, the object detection device 300, the communication device 400, the maneuvering device 500, the vehicle drive device 600, the navigation system 770, the sensing unit 120, or the controller 170.

The vehicle parking system 750 may be referred to as a vehicle parking control device. The navigation system 770 may provide navigation information. The navigation information may include at least one selected from among map information, information on a set destination, information on a route to the set destination, information on various objects along the route, lane information, and information on a current location of the vehicle.

The navigation system 770 may include a memory and a processor. The memory may store navigation information. The processor may control the operation of the navigation system 770. In some embodiments, the navigation system 770 may update pre-stored information by receiving information from an external device through the communication device 400. In some embodiments, the navigation system 770 may be classified as an element of the user interface device 200.

Conventional Technology

Figure 9:
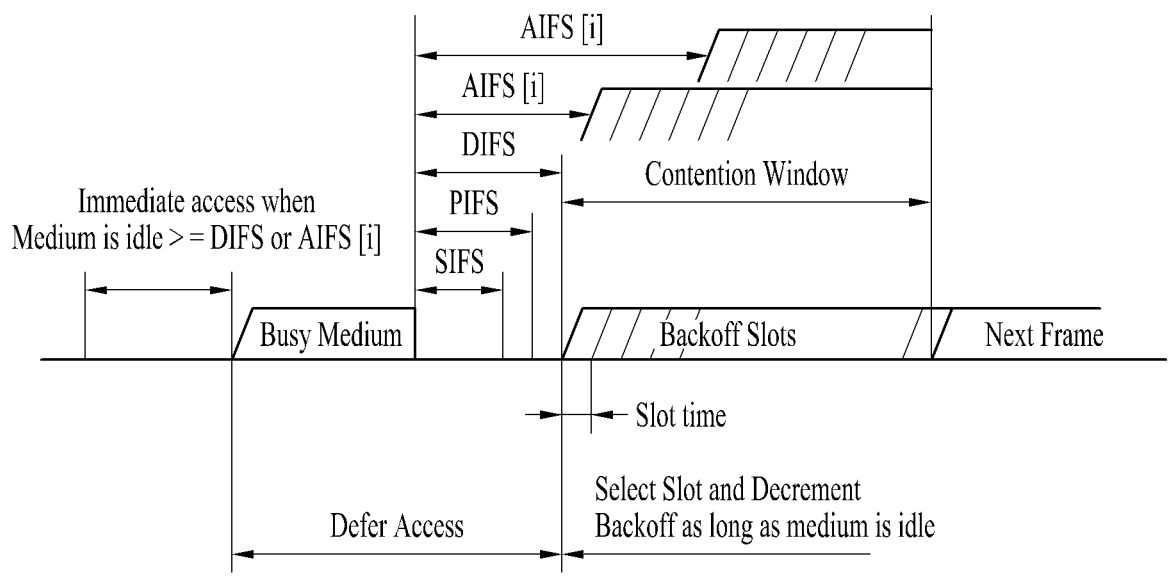
FIG. 9 is a view illustrating a clear channel assessment (CCA) operation.

FIG. 9 illustrates a part of a document describing the medium access control (MAC) layer and physical (PHY) layer of Institute of Electrical and Electronic Engineers (IEEE) 802.11p on which a dedicated short range communication (DSRC) interface is based. Specifically in FIG. 9, a station determines whether a medium is idle by clear channel assessment (CCA). In the CCA, if a received power value measured during a sensing period (e.g., a distributed coordinated function (DCF) inter-frame space (DIES) of 58 μs) is equal to or less than a CCA threshold, the station transmits on the medium, and if the received power value is larger than the CCA threshold, the station defers the transmission. If received power exceeding the CCA threshold is sensed, this means that there is another station neighboring to the station, competing for the medium.

The situation will be described in the context of an IEEE 802.11p-based DSRC interface. When received power measured by a mobile ITS station exceeds a CCA threshold due to communication interference from a drone, and thus a service related to a safety application cannot be provided, the mobile ITS station may be put in danger. Particularly, since DSRC interface-based vehicle-to-everything (V2X) basically relies on broadcasting, an acknowledgement/negative acknowledgement (ACK/NACK) is basically not transmitted, which makes DSRC interface-based V2X more vulnerable to communication failure.

Accordingly, the present disclosure provides a method of accurately determining a communication impossible state in a first embodiment (Embodiment 1), and a method of controlling a mobile ITS station placed in a communication impossible state in a second embodiment (Embodiment 2). While not shown in FIG. 7, a vehicle according to an embodiment of the present disclosure may further include a controller area network bus (CAN-BUS) and a telematics control unit (TCU). The CAN-BUS functions as an internal communication bridge between in-vehicle electronic control units, and the TCU can connect the CAN-BUS to an external system. In FIG. 7, the object detection device 300 can process information about the surroundings of the vehicle by the lidar 330, the radar 320, the ultrasonic sensor 340, or the camera 310, and the V2X communication unit 430 can perform communication in the afore-described DSRC/3GPP-based V2X.

In the following description, a "processor" of a mobile ITS station may be a component of a station separately carried by a vehicle passenger, the above-described TCU, or a CPU. Further, a "transmission module", a "reception module", or a "transceiver module" of the mobile ITS station may be a component of the station carried separately by the vehicle passenger, or the above-described V2X communication unit 430.

As described before, an aspect of the present disclosure provides a method of efficiently determining a communication impossible state of a DSRC interface, caused by signal interference from a drone or the like, and controlling a mobile ITS station according to the determined communication impossible state. For this purpose, a mobile ITS station according to an embodiment of the present disclosure determines whether the power of a signal received on a first channel in a DSRC interface exceeds a threshold, and if a time during which the power of the received signal exceeds the threshold or the number of times the power of the received signal exceeds the threshold satisfies a first predetermined value, determines that message transmission is impossible on the first channel.

Embodiment 1(Determination Methods)

1.1 Determination on Basis of Sensed Power and Message Quality of Service (QoS)

Figure 10:
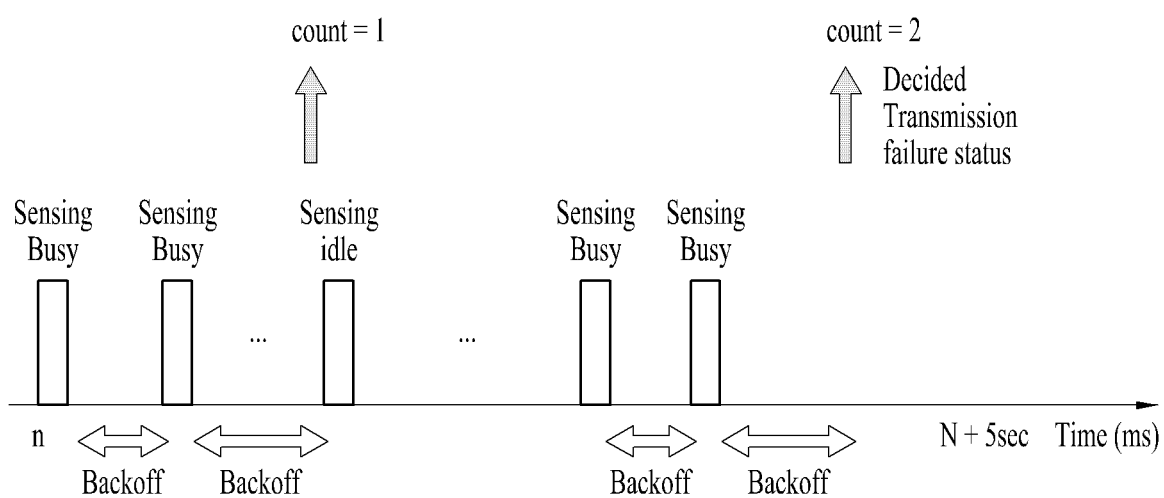
FIG. 10 is a view illustrating a method of determining the transmission failure of a message by a processor of a mobile intelligent transport system (ITS) station according to a first embodiment of the present disclosure.

FIG. 10 is a view illustrating a method of determining the transmission failure of a message by a processor of a mobile ITS station according to Embodiment 1 of the present disclosure. Specifically, the processor of the mobile ITS station senses received power during a sensing period through a transmission module. Subsequently, if a time during which the received power exceeds a CCA threshold or the number of times the received power exceeds the CCA threshold satisfies a predetermined value, the processor determines that message transmission is impossible on a corresponding channel.

When the CCA threshold is assumed to be −65 dBm, and n ms to n+5 ms are monitored in FIG. 10, a "channel busy" state in which received power exceeds the CCA threshold is detected twice, and the processor sets Count to 1 (Count=1). Then, a "channel idle" state in which the received power is equal to or less than the CCA threshold is detected once, and the "channel busy" state is detected twice again. Therefore, the processor sets Count to 2 (Count=2). Determining that the afore-described predetermined value is satisfied, the processor eventually determines that message transmission is impossible on a corresponding channel. The numerical values and CCA threshold used in the description given with reference to FIG. 10 are exemplary, and thus should not be construed as limiting the scope of the present disclosure.

Figure 11:
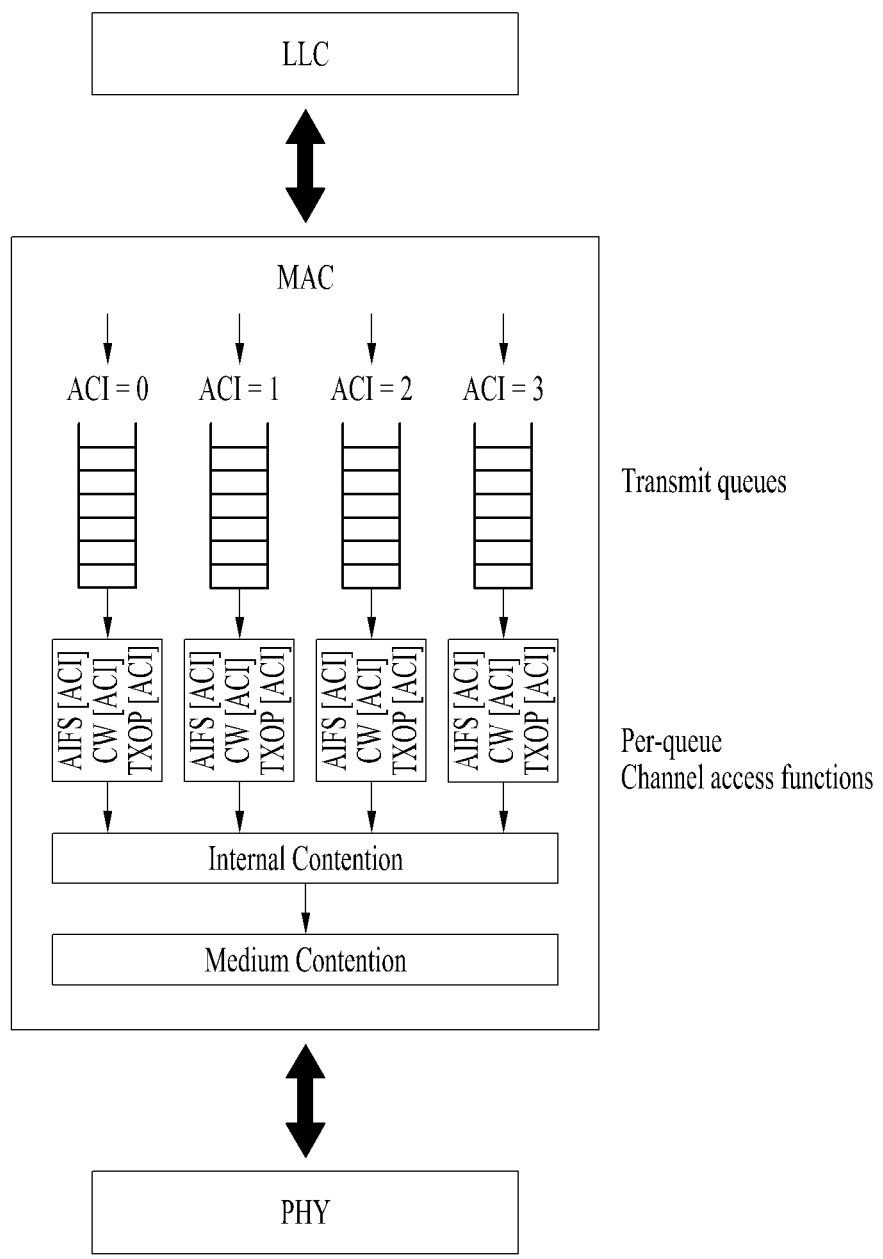
FIG. 11 is a view illustrating another method of determining the transmission failure of a message by a processor of a mobile ITS station according to the first embodiment of the present disclosure.

1.2 Determination on Basis of Number of Packets Accumulated in Transmission Buffer FIG. 11 is a view illustrating another method of determining the transmission failure of a message by a processor of a mobile ITS station according to Embodiment 1 of the present disclosure. Specifically, FIG. 11 illustrates accumulation of message packets, represented as the ACIs (=n) (n=0, 1, 2, 3) of transmit queues corresponding to the respective message packets.

The processor of the mobile ITS station monitors the number of message packets failed in transmission. The monitoring may be periodic, or aperiodic based on a predetermined triggering. If the number of packets accumulated in a buffer exceeds a predetermined value (e.g., 5), the processor of the mobile ITS station determines that message transmission is impossible on a corresponding channel.

1.3 Determination on Basis of Sensing Level and Validity of Received Message

FIG. 12 is a view illustrating another method of determining the transmission failure of a message by a processor of a mobile ITS station according to Embodiment 1 of the present disclosure. Specifically, the processor of the mobile ITS station can further determine the validity of a received signal by means of the cyclic redundancy check (CRC) of the signal as well as the afore-described received power of the signal. The operation is intended to further determine whether the received signal is radio interference from a drone or a valid V2X message transmitted from another vehicle.

The last field of an IEEE 802.11 MAC frame format illustrated in FIG. 12 is for a CRC required for message decoding. If the mobile ITS station succeeds in decoding a received message by the CRC of the message, the mobile ITS station determines that the received message is valid.

Therefore, if the power of a received signal is determined to exceed a CCA threshold and CRC failure continuously occurs, the processor can determine that message transmission is impossible on a corresponding channel. Or if the power of a received signal is determined to exceed the CCA threshold, and message decoding is successful (CRC OK), the processor does not determine that message transmission is impossible on the corresponding channel.

The mobile ITS station according to Embodiment 1 illustrated in FIG. 12 further determines the validity of a message by the CRC of the message as well as the received power of the message, thereby accurately and rapidly determining a message transmission impossible state on a corresponding channel.

1.4 Determination of Transmission Interruption State on Basis of Measured Inter-Packet Gap (IPG) of Neighboring Vehicle A description will be given of another method of determining the transmission failure of a message by a processor of a mobile ITS station according to Embodiment 1 of the present disclosure, in which the IPG of a neighboring vehicle is measured. The processor of the mobile ITS station can measure the IPG of another neighboring mobile ITS station in consideration of the type and sequence number (SN) of a signal received from the neighboring mobile ITS station. If the measured IGP exceeds a predetermined value, the processor can determine that message transmission is impossible on a corresponding channel.

Another vehicle which has received a message from the mobile ITS station measures an IPG representing a message reception interval and an SN. If the measurements exceed an SN difference and a predicted interval (e.g., 1 second), the vehicle can determine a "message interruption state of a neighboring vehicle" state. Specifically, since an SN increases each time the mobile ITS station transmits a message, another vehicle can predict an IPG from the type and SN difference of a packet, when receiving a message. Further, if the IPG exceeds a predetermined range (e.g., 100 ms+tolerance), the vehicle which has received the message can determine that the transmission time of the mobile ITS station is delayed.

Embodiment 2 below relates to a method of handling when a mobile ITS station determines that message transmission is impossible on a corresponding channel in the foregoing embodiment, Embodiment 1.

Embodiment 2 (Control Methods)

2.1 Delivery of Warning Message by using Infrastructure

Figure 13:
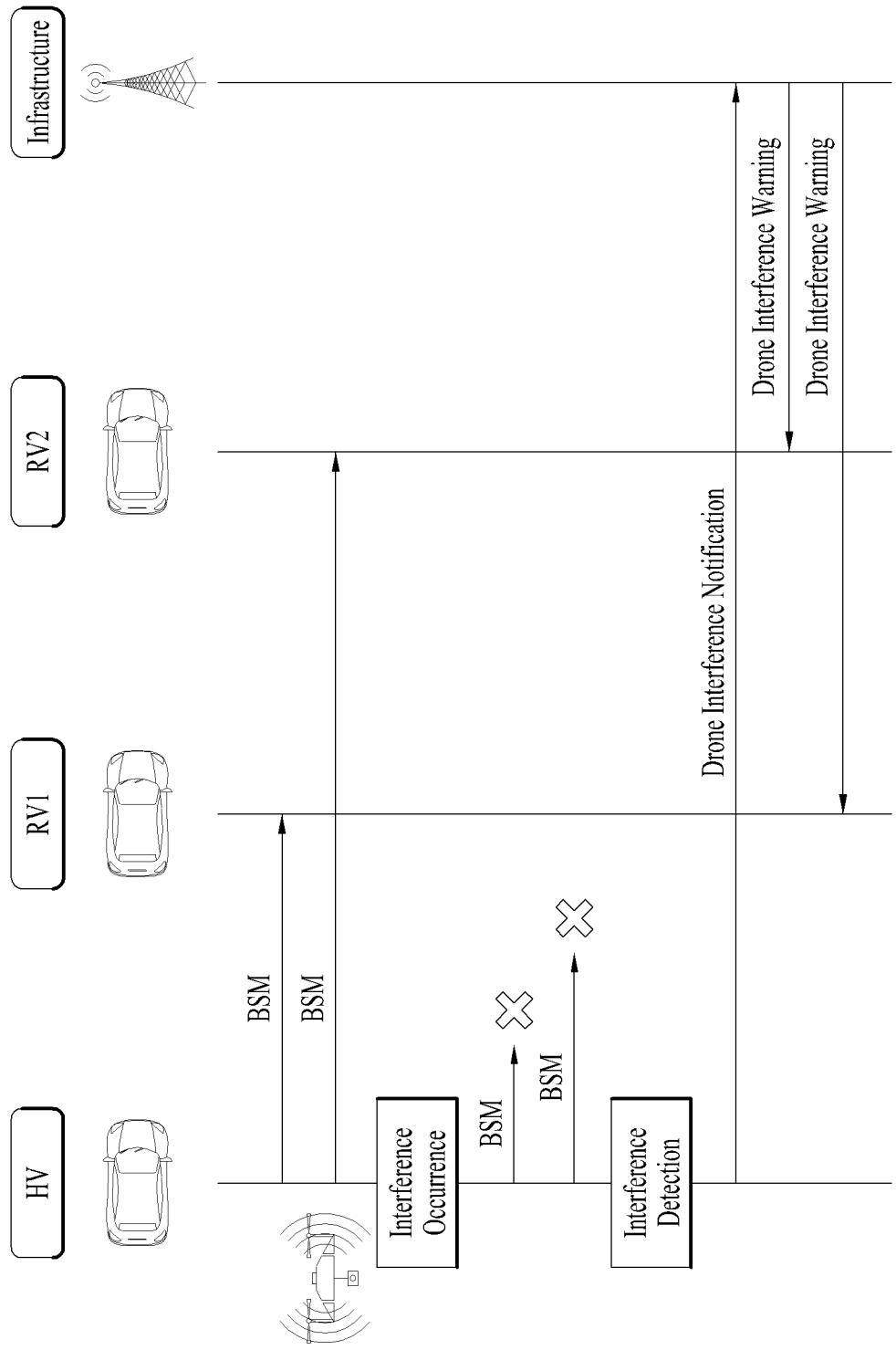
FIG. 13 is a view illustrating a signal flow for a method of controlling a mobile ITS station upon occurrence of the transmission failure of a message according to a second embodiment of the present disclosure.

FIG. 13 is a view illustrating a signal flow for a method of controlling a mobile ITS station upon occurrence of the transmission failure of a message according to Embodiment 2 of the present disclosure. Specifically, FIG. 13 illustrates a method of transmitting a warning message to a neighboring vehicle by using infrastructure (or a network node), when a mobile ITS station determines that message transmission is impossible. The following description is based on the assumption that a host vehicle (HV) is a mobile ITS station according to the present disclosure, and a remote vehicle (RV) is a neighboring vehicle in FIG. 13.

In a normal situation free of radio interference, the HV transmits a basic safety message (BSM) on a first channel of a DSRC interface to a first RV (RV1) and a second RV (RV2). In addition, it can be determined that it is impossible for the HV to transmit the BSM on the first channel to RV1 and RV2 due to radio interference from a drone. Under this assumption, the following two methods of controlling a mobile ITS station are proposed in Embodiment 2.

First, the HV can transmit the BSM to the infrastructure on a second channel (different from the first channel) of the DSRC interface. Secondly, the HV can transmit the BSM to a network node via a communication interface different from the DSRC interface. The communication interface different from the DSRC interface can be an ITS-G5 interface, a 3GPP LTE sidelink interface, or a new RAT (NR) eV2X interface. Finally, upon receipt of the BSM in one of the above two control methods, the network node can forward the BSM or a warning message to RV1 and RV2.

Figure 8:
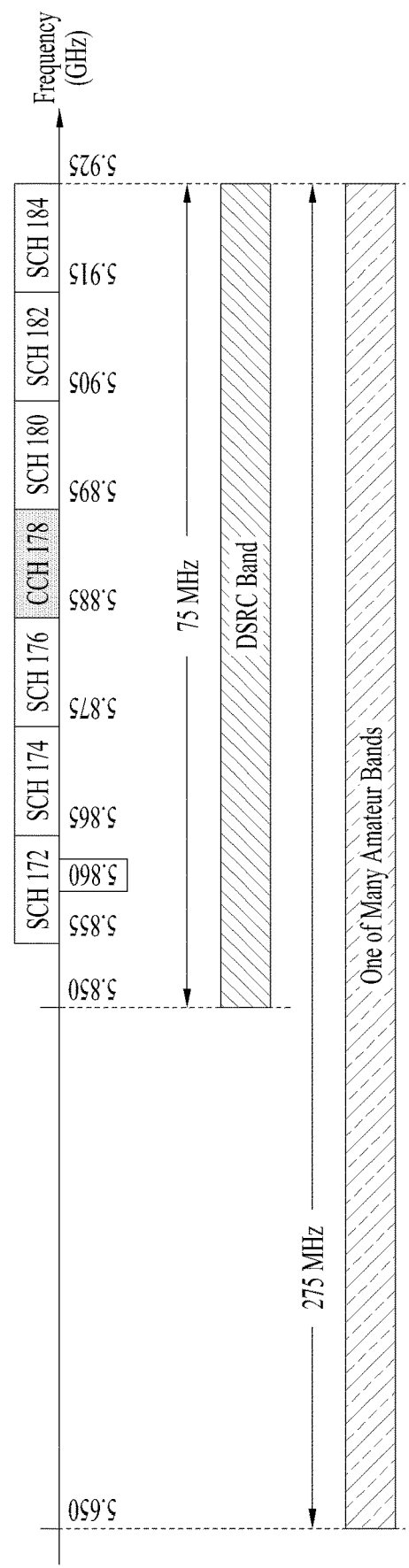
FIG. 8 is a view illustrating frequency bands used for a dedicated short range communication (DSRC) interface and amateur radio.

The method of transmitting a BSM on a second channel different from a first channel by an HV will be described in greater detail. Referring to FIG. 8, it can be noted that the frequency band of the DSRC interface ranges from 5.855 GHz to 5.925 GHz, and is divided into an SCH 172, an SCH 174, an SCH 176, a CCH 178, an SCH 180, an SCH 182, and an SCH 184 according to usages. Since the BSM is typically transmitted on a default channel, that is, the SCH 172, the first channel can be the SCH 172. If determining that message transmission is impossible on the first channel due to radio interference from a drone, the HV can transmit the BSM to the infrastructure on the second channel, for example, the CCH 178.

Figure 14:
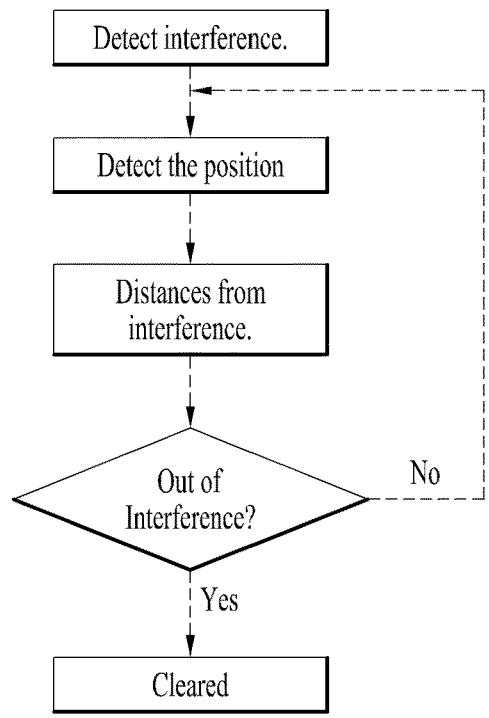
FIG. 14 is a flowchart illustrating another method of controlling a mobile ITS station upon occurrence of the transmission failure of a message according to the second embodiment of the present disclosure.
Figure 14:
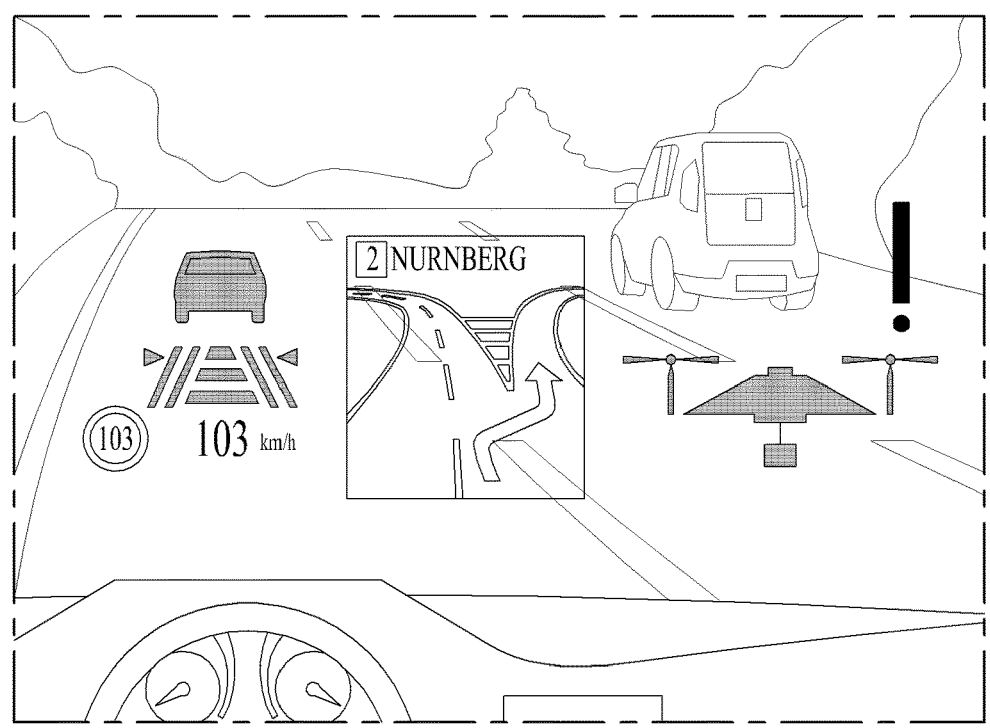

2.2 Prevention of Transmission Impossible State by Securing Distance Between Vehicle and Interference FIG. 14 is a flowchart illustrating another method of controlling a mobile ITS station upon occurrence of the transmission failure of a message according to Embodiment 2 of the present disclosure. Referring to the flowchart in the upper part of FIG. 14, the mobile ITS station can estimate a relative position and distance of an interfering object with respect to the mobile ITS station by using the power of a received signal, and can move to a position in which communication is possible on a first channel, by a control operation. The control operation can be to increase or decrease the speed of the vehicle, or to regenerate a path.

Further, as illustrated in the drawing in the lower part of FIG. 14, the processor of the mobile ITS station can provide a driver with the speed of the vehicle, a regenerated path, a radio interference indicator, etc. so that the mobile ITS station can move to a position in which communication is possible on the first channel.

2.3 Switching of BSM Transmission to Available Channel by Determining Available Frequency Driving a group of successive vehicles very closely together by following distance control is referred to as platooning. A platooning mobile ITS station receives information about movements and potential abnormalities of other vehicles within a platoon by V2V communication, and maintains distances to the other vehicles through a related control.

Figure 15:
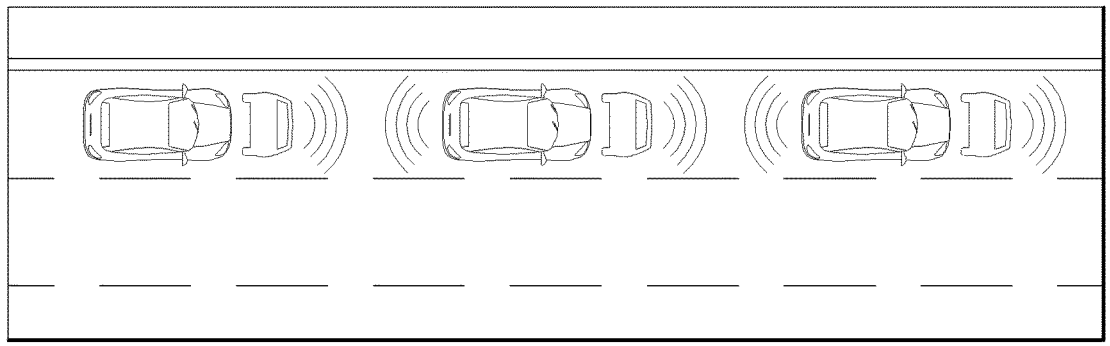
FIGS. 15 and 16 are views illustrating another method of controlling a mobile ITS station upon occurrence of the transmission failure of a message according to the second embodiment of the present disclosure.
Figure 15:
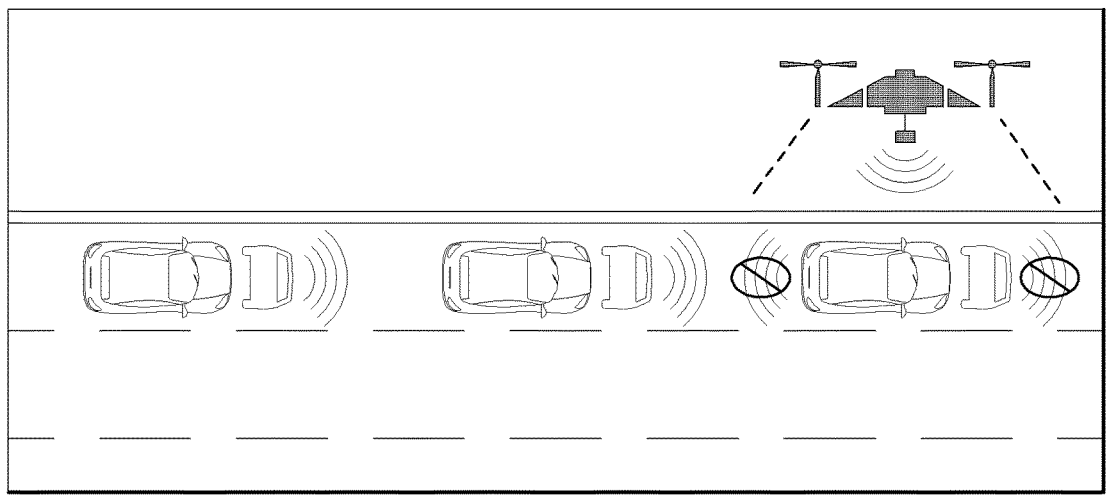
Figure 15:
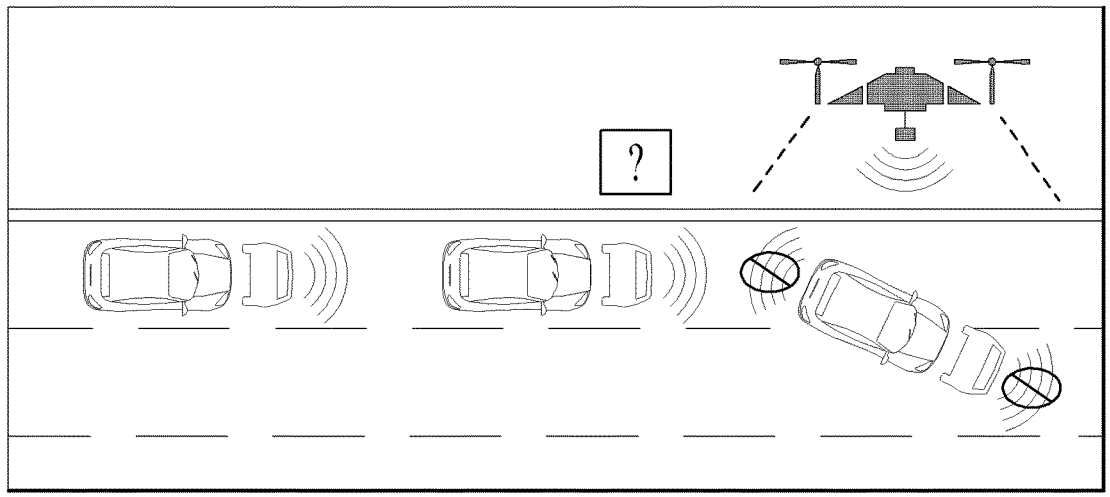

During platooning, following vehicles simply follow a preceding vehicle (or a leader vehicle). If the preceding vehicle suddenly moves out of a platooning path or radio interference occurs due to a drone, a situation in which the safety of a following vehicle is put in risk, for example, a situation illustrated in FIG. 15 can occur.

To solve the above problem, Embodiment 2 of the present disclosure provides a method of preconfiguring a service channel separately, and using the service channel, when a preceding vehicle abruptly moves out of a platooning path. That is, when a group is formed for platooning, it is possible to preconfigure a main channel and a service channel between vehicles. Each of the main channel and the service channel can be any one of the SCH 172, the SCH 174, the SCH 176, the CCH 178, the SCH 180, the SCH 182, and the SCH 184 which have been described with reference to FIG. 1.

When a preceding vehicle is to transmit to a following vehicle a message indicating that the preceding vehicle moves out of a platooning path due to radio interference from a drone, the preceding vehicle can first transmit the message on the main channel. If the main channel is not available, the preceding vehicle can transmit the message on the service channel.

Figure 16:
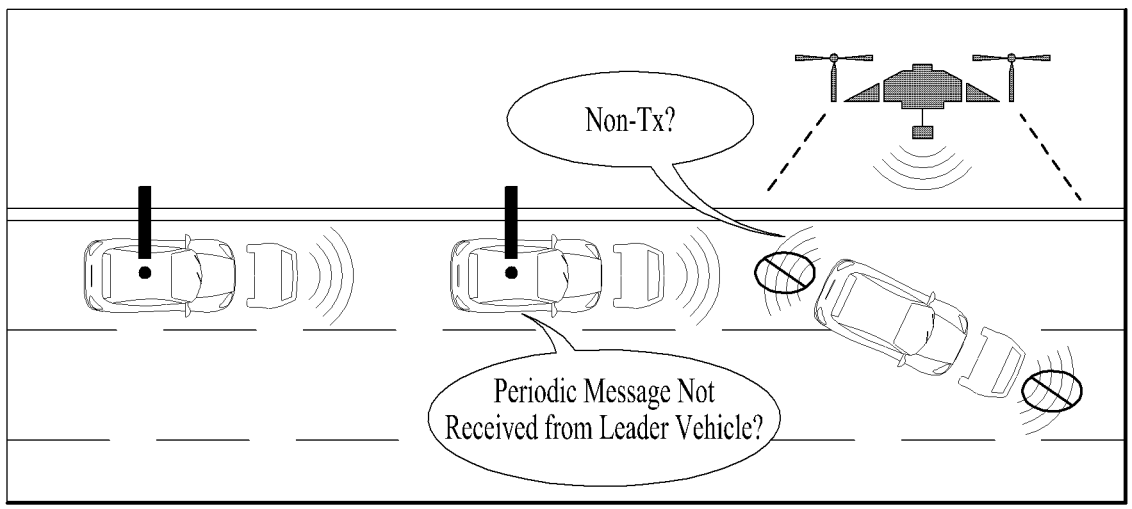
Figure 16:
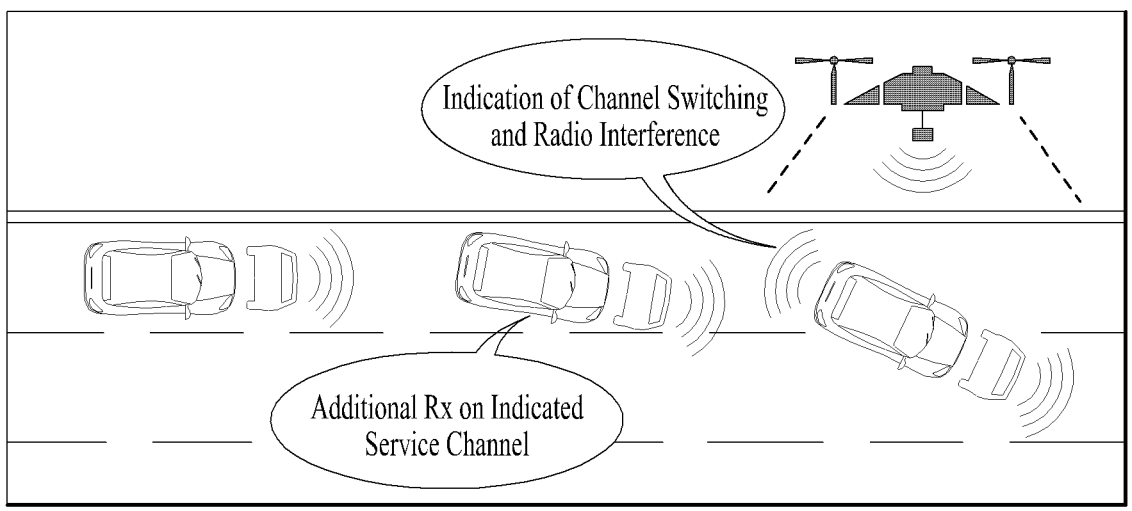

For example, if it is impossible for a preceding vehicle (the rightmost vehicle) to transmit a message due to radio interference from a drone in FIG. 16, the preceding vehicle can continuously transmit a message on a service channel. Or upon recognition of discontinuation of message reception on a main cannel from the preceding vehicle, a following vehicle can switch to the service channel and continuously receive the message on the service channel.

In general, a BSM is transmitted on the SCH 172 between vehicles. In Embodiment 2 of the present disclosure, it is proposed that if the SCH 172 is not available due to radio interference or the like, a mobile ITS station uses the CCH 178. Unlike other channels, the CCH 178 is a control channel with high transmission reliability and thus received as a default channel by other mobile ITS stations. Therefore, Embodiment 2 of the present disclosure proposes a method of directly transmitting a BSM on the CCH 178.

Further, Embodiment 2 of the present disclosure proposes a method of transmitting, on the CCH 178, a message indicating that a BSM will be transmitted on a channel different from the CCH 178, and transmitting the BSM on the different channel.

2.4 Change of Transmission Power or CCA Threshold

If received power from a drone at a mobile ITS station is kept equal to or larger than a CCA threshold, message transmission is also continuously impossible. To solve the problem, Embodiment 2 of the present disclosure proposes a method of increasing a CCA threshold, and increasing the transmission power of a message. In addition, the two control operations can be performed independently.

Figure 17:
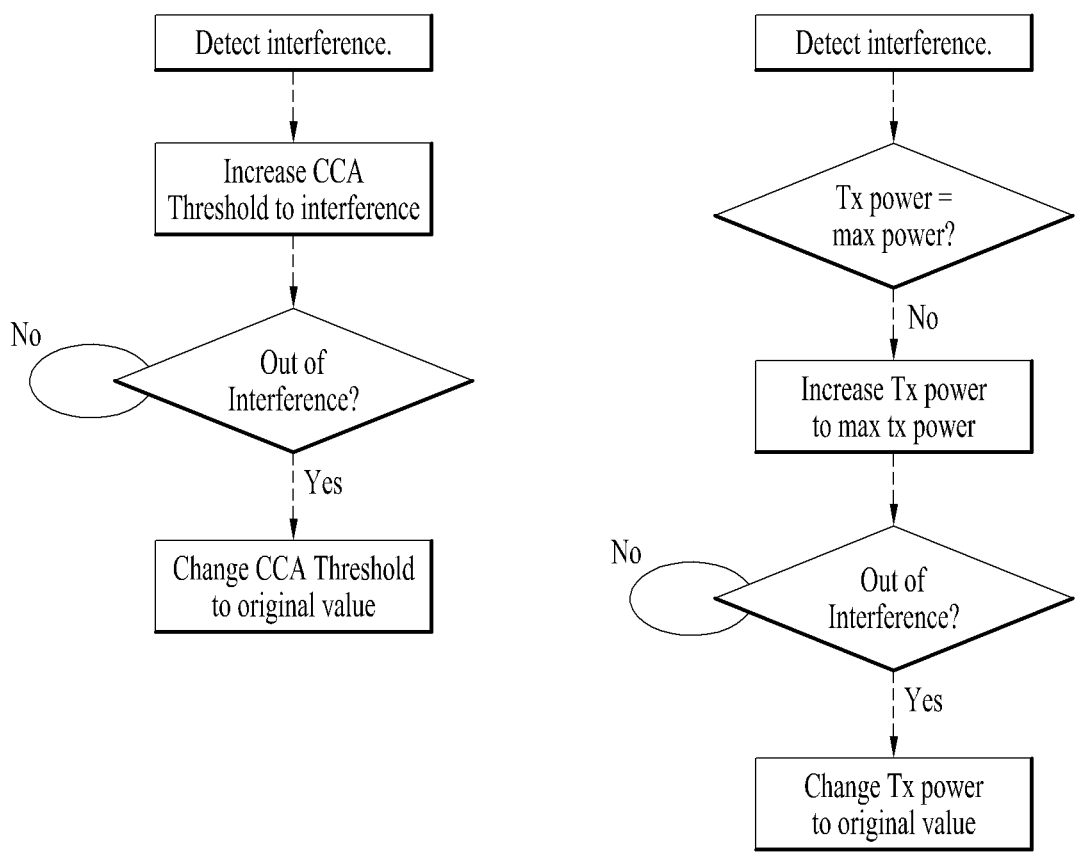
FIG. 17 is a flowchart illustrating another method of controlling a mobile ITS station upon occurrence of the transmission failure of a message according to the second embodiment of the present disclosure.

Specifically, referring to FIG. 17, if determining that message transmission is impossible on a first channel, a mobile ITS station can perform a control operation of increasing a CCA threshold or a control operation of increasing the transmission power of a message according to Embodiment 2 of the present disclosure.

If the CCA threshold is increased in the control method according to Embodiment 2 of the present disclosure, received power becomes lower than the CCA threshold, and thus the mobile ITS station can transmit a message on a corresponding channel, determining a channel idle state. Further, the mobile ITS station can efficiently transmit a message to a neighboring vehicle by increasing the message transmission power to a maximum transmission power.

2.5 Method of Retransmitting by RAT Switching

Figure 18:
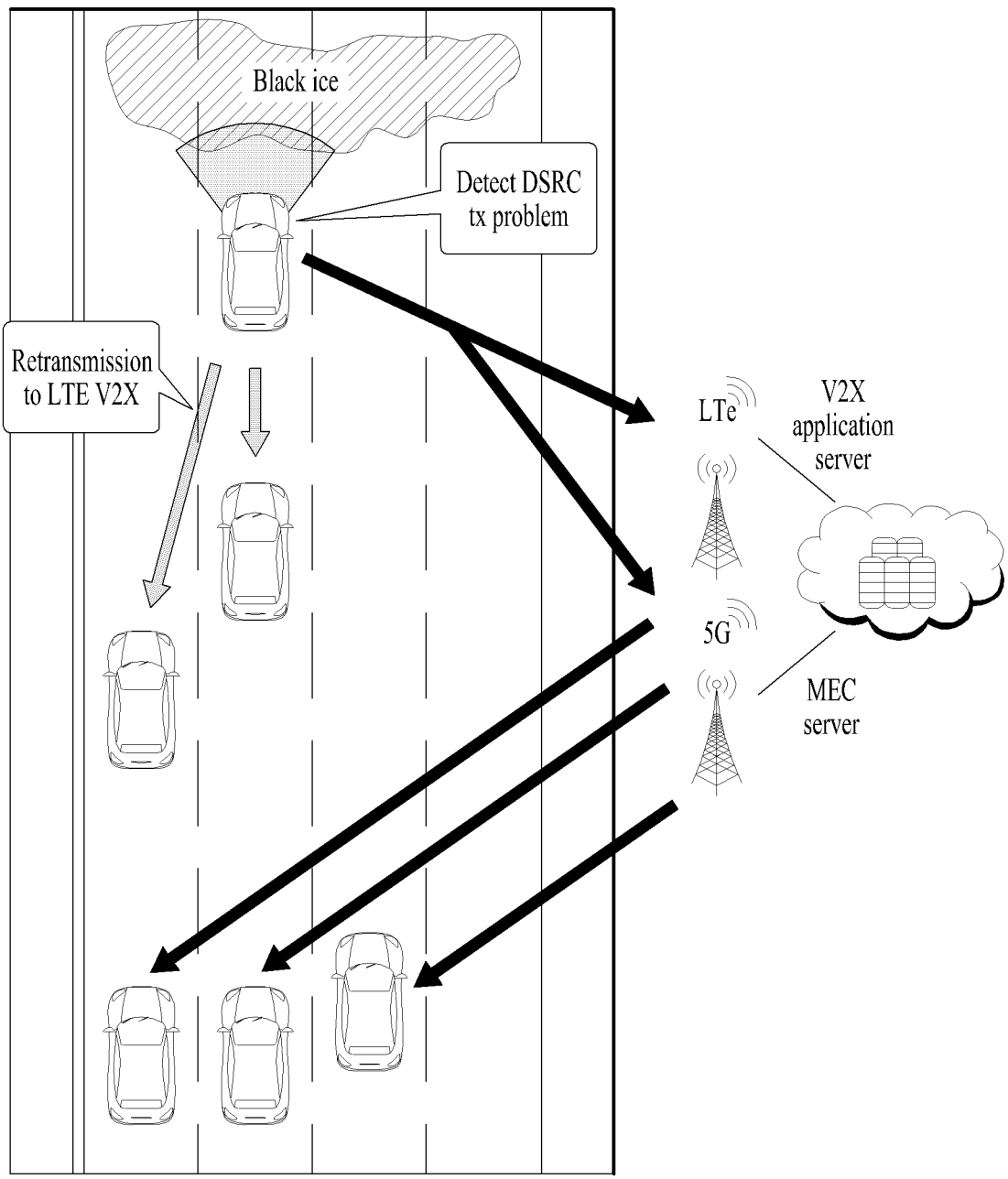
FIG. 18 is a view illustrating another method of controlling a mobile ITS station upon occurrence of the transmission failure of a message according to the second embodiment of the present disclosure.

FIG. 18 is a view illustrating another method of controlling a mobile ITS station upon occurrence of the transmission failure of a message according to Embodiment 2 of the present disclosure. That is, when determining an interference-caused transmission impossible state, the mobile ITS station according to Embodiment 2 of the present disclosure retransmits a message via another available communication service.

For example, the mobile ITS station can retransmit a message, which has failed in transmission, to an ITS server (V2X application server) or a mobile edge computing (MEC) server via an LTE Uu interface. Or the mobile ITS station can retransmit a message, which has failed in transmission, to the ITS server (V2X application server) or the MEC server (mobile edge computing server) via a 5G NR Uu interface. Or the mobile ITS station can retransmit a message, which has failed in transmission, to another vehicle or a roadside unit (RSU) via a 3GPP LTE sidelink interface.

2.6 Continuous Providing of Service in Association with Advanced Driver Assistance System (ADAS)

Figure 19:
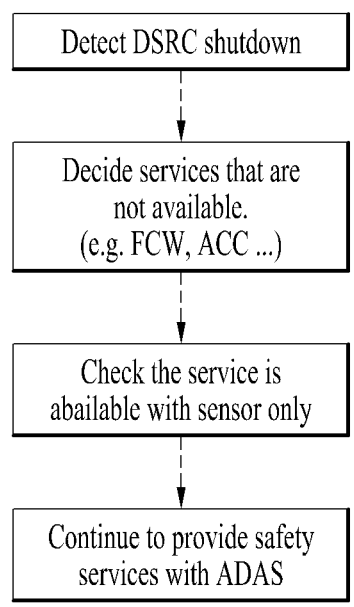
FIG. 19 is a flowchart illustrating another method of controlling a mobile ITS station upon occurrence of the transmission failure of a message according to the second embodiment of the present disclosure.

FIG. 19 is a flowchart illustrating another method of controlling a mobile ITS station upon occurrence of the transmission failure of a message according to Embodiment 2 of the present disclosure. Safety services provided by a mobile ITS station can include a service associated with V2X (e.g., a DSRC interface) and an ADAS service associated with at least one sensor equipped in a mobile ITS station.

In addition, if identifying a V2X communication interruption state caused by radio interference from a drone, the processor of a mobile ITS station can switch a V2X-associated service provided via a DSRC interface to an ADAS service provided through at least one sensor equipped in the mobile ITS station. Further, the processor can activate the at least one sensor and control the sensitivity of the at least one sensor, for the service switching.

For example, a forward collision warning (FCW) service can be provided by the V2X-associated service or the ADAS-associated service. Upon sensing DSRC shutdown (V2X impossible), the processor of the mobile ITS station can activate an inactive camera or increase the sensitivity of an already activated camera in order to switch from the V2X-associated service to the ADAS-associated service.

In addition, the FCW service is exemplary, and Embodiment 2 of the present disclosure as described above is applicable to various ADAS-associated services including adaptive cruise control (ACC), glare-free high beam, adaptive light control, automatic parking, automotive night vision, blind spot monitoring, a collision avoidance system, a driver monitoring System, an intersection assistant, intelligent speed adaptation, a lane departure warning system, lane change assistance, a pedestrian protection system, traffic sign recognition, etc.

Figure 20:
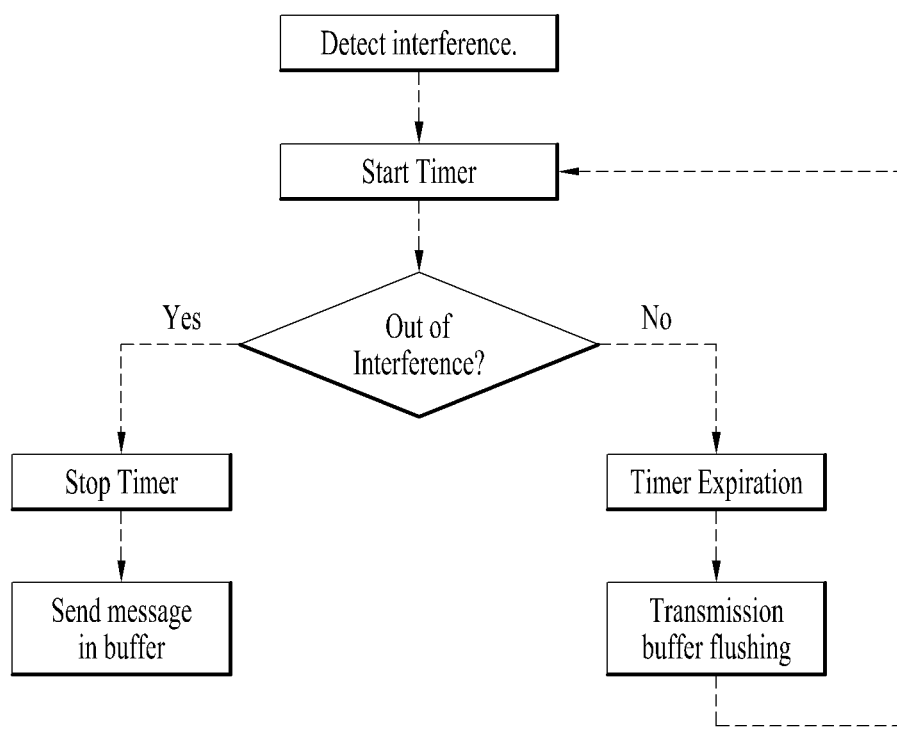
FIG. 20 is a flowchart illustrating another method of controlling a mobile ITS station upon occurrence of the transmission failure of a message according to the second embodiment of the present disclosure.

2.7 Prevention of Channel Congestion Caused by (Re) Transmission of Discontinued Packet FIG. 20 is a flowchart illustrating another method of controlling a mobile ITS station upon occurrence of the transmission failure of a message according to Embodiment 2 of the present disclosure. If a message transmission impossible state is entered due to radio interference from a drone, messages failed in transmission are continuously accumulated in a transmission buffer. Thus, if a mobile ITS station moves out of the coverage of the radio interference, the messages accumulated in the transmission buffer are transmitted at one time, thereby causing channel congestion.

To solve the problem, Embodiment 2 of the present disclosure proposes a method of flushing messages accumulated in a transmission buffer. Specifically, when determining that message transmission is impossible on a first channel, the processor of the mobile ITS station starts a timer set to a predetermined value. If the power of a signal received on the first channel is equal to or less than a CCA threshold before expiration of the predetermined timer value, the processor can transmit messages accumulated in the transmission buffer. Upon expiration of the timer value, the processor can delete the messages accumulated in the transmission buffer of the mobile ITS station.

As is apparent from the foregoing description, the method of determining a message transmission and reception state in a DSRC interface, and controlling a mobile ITS station based on the determined message transmission and reception state according to an aspect of the present disclosure has the following effects.

First, since a radio attack can easily be handled, the reliability of a safety application service is increased. Secondly, as a driver of a vehicle can recognize a risky situation caused by communication interruption, the driver can carefully drive. Thirdly, it is possible to decrease an autonomous driving level or switch to manual driving by determining a risky situation during autonomous driving. Fourthly, problems that can occur after communication interruption can be solved.

As described above, while the embodiments of the present disclosure have been described in the context of a system using IEEE/3GPP-based V2X, by way of example, they can find their wide use in V2X application systems.

The embodiments of the present disclosure can be achieved by various means, for example, hardware, firmware, software, or a combination thereof. In a hardware configuration, the methods according to embodiments of the present disclosure can be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the methods according to the embodiments of the present disclosure can be implemented in the form of a module, a procedure, a function, or the like which performs the above-described functions or operations Software code can be stored in a memory unit and executed by a processor. The memory unit is located at the interior or exterior of the processor, and can transmit and receive data to and from the processor via various known means.

As described above, preferred embodiments of the present disclosure have been described such that those skilled in the art could realize and implement the present disclosure. While reference has been made above to the preferred embodiments of the present disclosure, those skilled in the art will appreciate that various modifications and variations can be made to the present disclosure without departing from the spirit and scope of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. Both a product invention and a process invention have been described in the disclosure, and when needed, the descriptions of both the inventions are applicable supplementally.

What is claimed is:

1. A method of controlling a mobile intelligent transport system (ITS) station, the method comprising:
   sensing a power of a signal received on a first channel of a dedicated short-range communication (DSRC) interface of the mobile ITS station during a sensing period;
   when a time during which the power of the received signal is greater than a clear channel assessment (CCA) threshold, and a number of times the power of the received signal is greater than the CCA threshold satisfies a first predetermined value, determining a message transmission is impossible on the first channel;
   when the message transmission is determined to be impossible on the first channel, starting a timer set to a predetermined value;
   when the power of the signal received on the first channel is equal to or less than the CCA threshold, transmitting messages accumulated in a transmission buffer of the mobile ITS station; and
   upon expiration of the predetermined value, deleting the messages accumulated in the transmission buffer of the mobile ITS station.

2. The method according to claim 1, further comprising:
   determining a validity of the received signal by a cyclic redundancy check (CRC) of the received signal.

3. The method according to claim 2, further comprising:
   when the received signal is not valid, determining the message transmission is impossible on the first channel.

4. The method according to claim 1, further comprising:
   monitoring a number of packets accumulated in a transmission buffer of the mobile ITS station; and
   when the number of packets is larger than a second predetermined value, determining the message transmission is impossible on the first channel.

5. The method according to claim 1, further comprising:
   measuring an inter-packet gap (IPG) in consideration of a type and sequence number (SN) of a signal received from another mobile ITS station neighboring the mobile ITS station; and
   when the measured IPG is larger than a second predetermined value, determining the message transmission is impossible on the first channel.

6. The method according to claim 1, further comprising:
   transmitting a basic safety message (BSM) to a neighboring mobile ITS station on the first channel; and
   when the transmission of the BSM is determined to be impossible on the first channel, transmitting the BSM to a network node on a second channel of the DSRC interface.

7. The method according to claim 6, wherein the BSM is forwarded to at least one other mobile ITS station through the network node.

8. The method according to claim 1, further comprising:
   transmitting a basic safety message (BSM) to at least one other mobile ITS station on the first channel, and
   when the transmission of the BSM is determined to be impossible on the first channel, transmitting the BSM to a network node via a communication interface other than the DSRC interface.

9. The method according to claim 1, further comprising:
   estimating a relative position and distance of an interfering object from the mobile ITS station by using the power of the received signal; and
   moving the mobile ITS station to a position in which communication is possible on the first channel.

10. The method according to claim 1, further comprising:
    when the mobile ITS station is platooning together with at least one other mobile ITS station by using the first channel, and the message transmission is determined to be impossible on the first channel, transmitting a message on a second channel of the DSRC interface, the second channel being preconfigured as a service channel between platooning vehicles.

11. The method according to claim 1, further comprising:
    when the message transmission is determined to be impossible on the first channel, switching, via an advanced driver assistance system (ADAS) of the mobile ITS station, a service provided through the DSRC interface in a service list to a service provided through at least one sensor included in the mobile ITS station.

12. The method according to claim 11, wherein the at least one sensor is activated and a sensitivity of the at least one sensor is controlled in order to provide the service provided through the at least one sensor included in the mobile ITS station.

13. The method according to claim 1, further comprising:
    when the message transmission is determined to be impossible on the first channel, increasing the threshold or increasing a message transmission power of the mobile ITS station.

14. A mobile intelligent transport system (ITS) station comprising:
    a transceiver; and
    a processor configured to:
    sense a power of a signal received on a first channel of a dedicated short-range communication (DSRC) interface of the mobile ITS station during a sensing period,
    when a time during which the power of the received signal is greater than a clear channel assessment (CCA) threshold, and a number of times the power of the received signal is greater than the CCA threshold satisfies a first predetermined value, determining a message transmission is impossible on the first channel,
    when the message transmission is determined to be impossible on the first channel, start a timer set to a predetermined value, when the power of the signal received on the first channel is equal to or less than the CCA threshold, transmit messages accumulated in a transmission buffer of the mobile ITS station, and upon expiration of the predetermined value, delete the messages accumulated in the transmission buffer of the mobile ITS station.

15. The mobile ITS station according to claim 14, wherein the processor is further configured to:

determine a validity of the received signal by a cyclic redundancy check (CRC) of the received signal, and when the received signal is not valid, determine the message transmission is impossible on the first channel.

16. The mobile ITS station according to claim 14, wherein the processor is further configured to:

transmit a basic safety message (BSM) to a neighboring mobile ITS station on the first channel, and when the transmission of the BSM is determined to be impossible on the first channel, transmit the BSM to a network node on a second channel of the DSRC interface.

17. The mobile ITS station according to claim 14, wherein the processor is further configured to:

when the message transmission is determined to be impossible on the first channel, increase the threshold or increase a message transmission power of the mobile ITS station.

* * * * *